United States Patent
Lee et al.

(10) Patent No.: US 8,917,686 B2
(45) Date of Patent: Dec. 23, 2014

(54) UPLINK SIGNAL TRANSMISSION METHOD USING CONTENTION-BASED IDENTIFIERS

(75) Inventors: Hyun Woo Lee, Anyang-si (KR); Ji Woong Jang, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 13/641,659

(22) PCT Filed: Apr. 28, 2011

(86) PCT No.: PCT/KR2011/003156
§ 371 (c)(1),
(2), (4) Date: Oct. 16, 2012

(87) PCT Pub. No.: WO2011/136586
PCT Pub. Date: Nov. 3, 2011

(65) Prior Publication Data
US 2013/0034071 A1 Feb. 7, 2013

Related U.S. Application Data

(60) Provisional application No. 61/328,637, filed on Apr. 28, 2010.

(30) Foreign Application Priority Data

Apr. 27, 2011 (KR) .......................... 10-2011-0039287

(51) Int. Cl.
*H04W 72/04* (2009.01)

(52) U.S. Cl.
CPC .................................. *H04W 72/042* (2013.01)
USPC .............................. 370/329; 370/341; 370/322

(58) Field of Classification Search
USPC .......................................... 370/329, 431, 341
See application file for complete search history.

(56) References Cited

U.S. PATENT DOCUMENTS

| | | | |
|---|---|---|---|
| 2007/0104141 A1 | 5/2007 | Park et al. | |
| 2011/0134873 A1* | 6/2011 | Cho et al. | 370/329 |
| 2011/0205993 A1* | 8/2011 | Cho et al. | 370/329 |

FOREIGN PATENT DOCUMENTS

| | | |
|---|---|---|
| JP | 2009-526431 | 7/2009 |
| WO | WO 2009-022860 | 2/2009 |
| WO | WO 2010-024607 | 3/2010 |

* cited by examiner

*Primary Examiner* — Dang Ton
*Assistant Examiner* — Pamit Kaur
(74) *Attorney, Agent, or Firm* — Mckenna Long & Aldridge LLP

(57) ABSTRACT

The present invention discloses various methods and apparatuses for allocating identifiers and resources associated with a contention-based uplink channel and using the identifiers and resources. An uplink (UL) signal transmission method using a contention-based identifier (CB identifier) according to one embodiment of the present invention comprises a step in which user equipment receives, from a base station, a first message containing a CD identifier (CB-RNTI); a step in which the user equipment receives, from the base station, a second message containing information on the allocation of the contention-based uplink (CB UL) channel associated with the CB identifier; and a step in which the user equipment transmits an UL signal to the base station via the CB UL channel.

12 Claims, 13 Drawing Sheets

UPLINK SIGNAL TRANSMISSION METHOD
USING CONTENTION-BASED IDENTIFIERS

This application is a 35 U.S.C. §371 National Stage of International Application No. PCT/KR2011/003156, filed Apr. 28, 2011 and claims the benefit of U.S. Provisional Application No. 61/328,637, filed Apr. 28, 2010, and Korean Application No: 10-2011-0039287, filed Apr. 27, 2011, all of which are incorporated by reference in their entirety herein.

TECHNICAL FIELD

The present invention relates to an efficient communication method used in a radio access system and more particularly to methods and apparatuses for allocating and using a resource and an identifier associated with a contention based uplink channel.

BACKGROUND ART

Radio access systems have been widely deployed to provide various types of communication services such as voice or data services. Radio access systems are generally multiple access systems in which available system resources (such as bandwidths and transmission power) are shared to support communication of multiple users. Examples of the multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The present invention takes into consideration use of contention based uplink channels in order to reduce uplink processing latency. A Contention Based Uplink (CB UL) channel is a channel through which a user equipment can transmit uplink data of the user equipment even when the user equipment has not initially requested that a base station perform UE-specific scheduling for uplink resource allocation of the user equipment in the channel.

When new CB UL channels are defined or when existing uplink channels are used as CB UL channels, there is a need to provide an identifier for allocation and classification (or discrimination) of such uplink channels.

An object of the present invention is to provide a method for efficiently transmitting and receiving an uplink signal.

Another object of the present invention is to provide a method of using an identifier associated with a contention based uplink channel.

Another object of the present invention is to provide a method for allocating a resource of a contention based uplink channel according to an identifier associated with the contention based uplink channel.

Objects of the present invention are not limited to those described above and other objects will be clearly understood by a person having ordinary knowledge in the art from the following description.

Technical Solution

The present invention discloses various methods and apparatuses for allocating and using a resource and an identifier associated with a contention based uplink channel.

A method for transmitting an uplink (UL) signal using a Contention Based (CB) identifier according to an embodiment of the present invention may include a user equipment receiving a first message including the CB identifier from a base station, the user equipment receiving a second message including allocation information of a Contention Based Uplink (CB UL) channel associated with the CB identifier from the base station, and the user equipment transmitting the UL signal to the base station through the CB UL channel.

A method for receiving an uplink (UL) signal using a Contention Based (CB) identifier according to another embodiment of the present invention may include a base station transmitting a first message including the CB identifier to a user equipment, the base station transmitting a second message including allocation information of a Contention Based Uplink (CB UL) channel associated with the CB identifier to the user equipment, and the base station receiving the UL signal from the user equipment through the CB UL channel.

A user equipment for transmitting an uplink (UL) signal using a Contention Based (CB) identifier according to another embodiment of the present invention may include a reception module for receiving a channel signal, a transmission module for transmitting a channel signal, and a processor that supports transmission of the UL signal using the CB identifier, wherein the user equipment may receive a first message including the CB identifier from a base station and a second message including allocation information of a Contention Based Uplink (CB UL) channel associated with the CB identifier from the base station using the reception module, and the user equipment may transmit the UL signal to the base station through the CB UL channel using the transmission module.

In the above embodiments of the present invention, the CB identifier may be allocated to the user equipment taking into consideration service type or latency requirement.

In addition, the first message may be received through a broadcast channel and the second message is received through a downlink physical channel. Here, the first message may further include period information of the CB UL channel according to service type. The user equipment may decode the second message using the CB identifier at a time point indicated by the period information to check whether or not the CB UL channel has been actually allocated to the user equipment. That is, in the case in which the base station has allocated a CB UL channel to the user equipment at a time point indicated by the period information, the base station may transmit a message including allocation information of the CB UL channel to the user equipment. Here, the user equipment may decode the message received through the CB UL channel using the CB identifier allocated to the user equipment.

The above embodiments of the present invention are just some of the preferred embodiments of the present invention and various embodiments in which technical features of the present invention are reflected may be derived and understood from the following detailed description of the present invention by a person having ordinary knowledge in the art.

Advantageous Effects

The following are advantages according to the embodiments of the present invention.

First, the user equipment can efficiently transmit an uplink signal.

Second, the user equipment and the base station can use an identifier associated with a contention based uplink channel (CB UL channel) and therefore it is possible to efficiently classify (divide, discriminate, or identify) and use a plurality of contention based channels and newly defined contention based channels.

Third, the base station can efficiently allocate resources for contention based uplink channels using an identifier associated with a CB UL channel and an allocation period.

Fourth, the base station can allocate a CB UL channel according to service type and therefore it is possible to efficiently use physical uses. In addition, it is possible to reduce the probability of collisions in a CB UL channel for a specific service type.

Fifth, the base station can allocate a CB UL channel according to latency requirement and therefore it is possible to efficiently use physical resources and it is possible to efficiently adjust latency of UL signal transmission through the CB UL channel.

Sixth, through classification of a specific set of CB UL channel allocation resources and/or CB identifiers (for example, classification according to MCS, transmission power, service type, or latency requirement) and using classification methods (for example, classification methods based on a specific set, a reference value, collision probability, or priority), it is possible to achieve efficient use of physical resources for each classification of CB UL channels and to efficiently control the probability of collision for each classification of CB UL channels.

Seventh, the base station can perform allocation of CB UL channel resources extended in time or frequency and therefore it is possible to guarantee the performance of detection and decoding of CB UL channels, in a state in which it is not possible to determine the channel state of the user equipment, and it is also possible to minimize waste of physical resource allocation of CB UL channels by the base station.

Advantages of the present invention are not limited to those described above and other advantages will be clearly understood by a person having ordinary knowledge in the art from the following description. That is, unintended advantages acquired by carrying out the present invention may be derived from the embodiments of the present invention by a person having ordinary knowledge in the art.

BEST MODE

Figure 1:
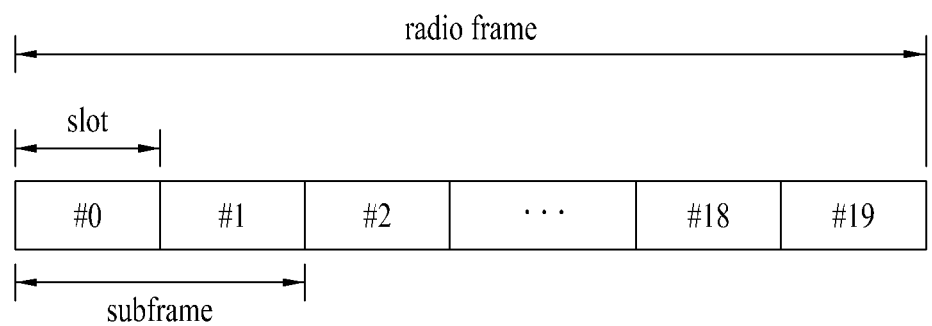
FIG. 1 illustrates a structure of a radio frame that can be used in the embodiments of the present invention.

The embodiments of the present invention relate to various methods for transmitting and receiving contention based uplink channel signals and apparatuses that support the methods.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

In the following description made in conjunction with the drawings, procedures or steps that may obscure the subject matter of the present invention are not described and procedures or steps that will be apparent to those skilled in the art are also not described.

The embodiments of the present invention have been described focusing mainly on the data communication relationship between a Mobile Station (MS) and a Base Station (BS). The BS is a terminal node in a network which performs communication directly with the MS. Specific operations which have been described as being performed by the BS may also be performed by an upper node as needed.

That is, it will be apparent to those skilled in the art that the BS or any other network node may perform various operations for communication with MSs in a network including a number of network nodes including BSs. Here, the term "base station (BS)" may be replaced with another term such as "fixed station", "Node B", "eNode B (eNB)", Advanced Base Station (ABS), or "access point".

The term "terminal" may also be replaced with another term such as "User Equipment (UE)", "Mobile Station (MS)", "Subscriber Station (SS)", "Mobile Subscriber Station (MSS)", "mobile terminal", or "Advanced Mobile Station (AMS)".

The term "transmitting end" refers to a stationary and/or mobile node that provides data or audio services and "receiving end" refers to a stationary and/or mobile node that receives data or audio services. Thus, in uplink, the mobile station may be a transmitting end and the base station may be a receiving end. Similarly, in downlink, the mobile station may be a receiving end and the base station may be a transmitting end.

The embodiments of the present invention can be supported by standard documents of at least one of the IEEE 802xx system, the 3rd Generation Partnership Project (3GPP) system, the 3GPP LTE system, and the 3GPP2 system which are wireless access systems and can be supported especially by documents of 3GPP TS 36.211, 3GPP TS 36.212, 3GPP TS 36.213, and 3GPP TS 36.321. That is, obvious steps or portions that are not described in the embodiments of the present invention can be explained with reference to the standard documents. For all terms used in this disclosure, reference can be made to the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in embodiments of the present invention are provided for better understanding of the present invention and can be replaced with other terms without departing from the spirit of the present invention.

Technologies described below can be used in various wireless access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

CDMA may be implemented with a radio technology such as Universal Terrestrial Radio Access (UTRA) or CDMA2000. TDMA may be implemented with a radio technology such as Global System for Mobile communication (GSM), General Packet Radio Service (GPRS), or Enhanced Data rates for GSM Evolution (EDGE). OFDMA may be implemented with a radio technology such as IEEE 802.11 (Wi-Fi), IEEE 802.16 (WiMAX), IEEE 802.20, or Evolved-UTRA (E-UTRA).

UTRA is a part of Universal Mobile Telecommunication System (UMTS). 3rd Generation Partnership Project (3GPP) Long Term Evolution (LTE) is a part of Evolved-UMTS (E-UMTS) that uses E-UTRA. 3GPP LTE employs OFDMA for downlink and employs SC-FDMA for uplink. The LTE-Advanced (LTE-A) system is an evolution of 3GPP LTE system. Although the present invention will be described below mainly with reference to 3GPP LTE/LTE-A for clear explanation of the technical features of the present invention, the present invention may also be applied to an IEEE 802.16e/m system or the like.

1. Basic Structure of 3GPP LTE/LTE-A System

FIG. 1 illustrates a structure of a radio frame that can be used in the embodiments of the present invention.

A radio frame includes 10 subframes and one subframe includes 2 slots. The time required to transmit one subframe is referred to as a "Transmission Time Interval (TTI)". Here, the length of each subframe may be 1 ms and the length of each slot may be 0.5 ms.

One slot includes a plurality of Orthogonal Frequency Division Multiplexing (OFDM) symbols in the time domain and includes a plurality of Resource Blocks (RBs) in the frequency domain. An OFDM symbol represents a symbol period in the 3GPP LTE system that uses Orthogonal Frequency Division Multiplexing Access (OFDMA) in downlink. That is, an OFDM signal may be referred to as an SC-FDMA symbol or symbol period depending on the multiple access scheme. The RB, which is a resource allocation unit, includes a plurality of consecutive subcarriers in one slot.

The radio frame structure of FIG. 1 is only illustrative and the number of subframes included in a radio frame, the number of slots included in a subframe, and the number of OFDM symbols included in a slot may be changed variously.

Figure 2:
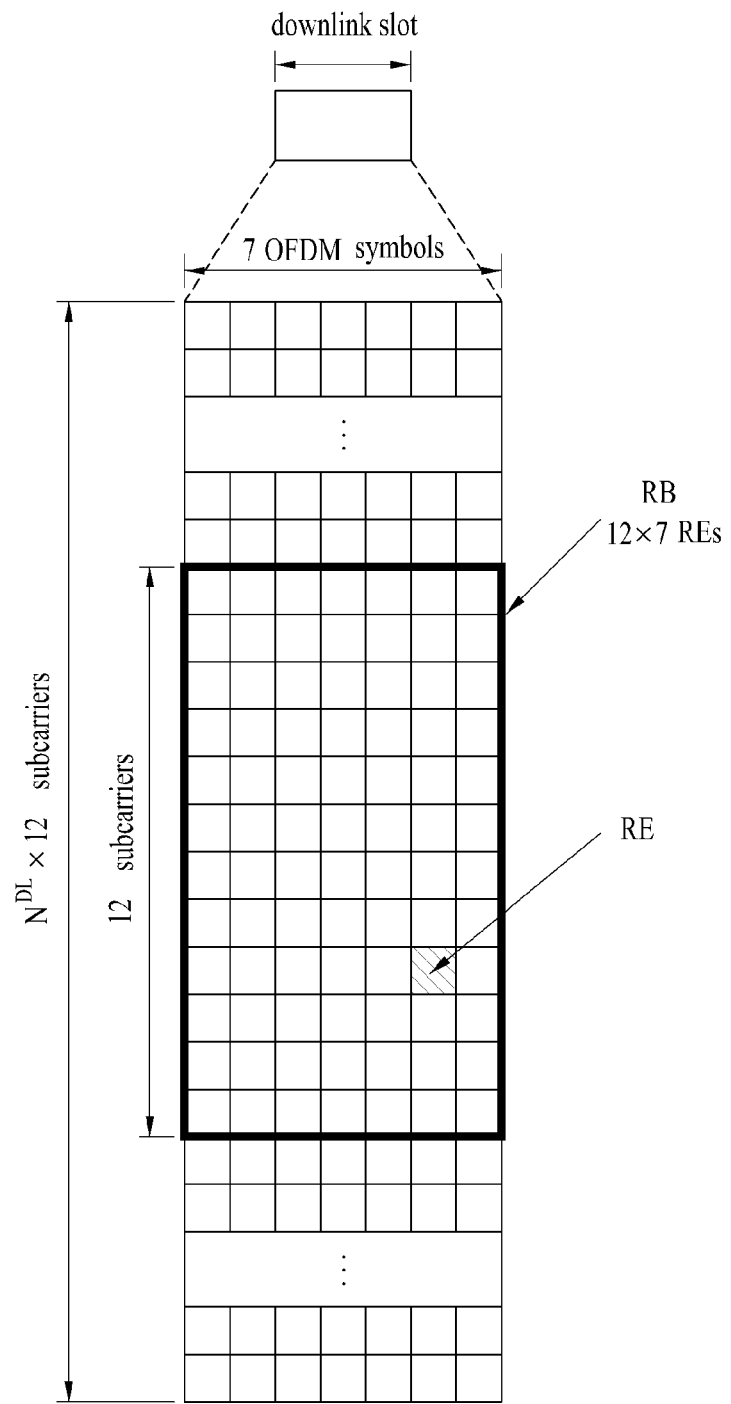
FIG. 2 illustrates a resource grid of one downlink slot that can be used in the embodiments of the present invention.

FIG. 2 illustrates a resource grid of one downlink slot that can be used in the embodiments of the present invention.

One uplink slot includes a plurality of SC-FDMA symbols in the time domain. FIG. 2 illustrates an example in which one downlink slot includes 7 OFDM symbols and one Resource Block (RB) includes 12 subcarriers in the frequency domain.

Each element in the resource grid is referred to as a resource element (RE) and one resource block (RB) includes 12×7 resource elements. The number of resource blocks ($N^{DL}$) included in one downlink slot depends on a downlink transmission bandwidth set in the cell.

Figure 3:
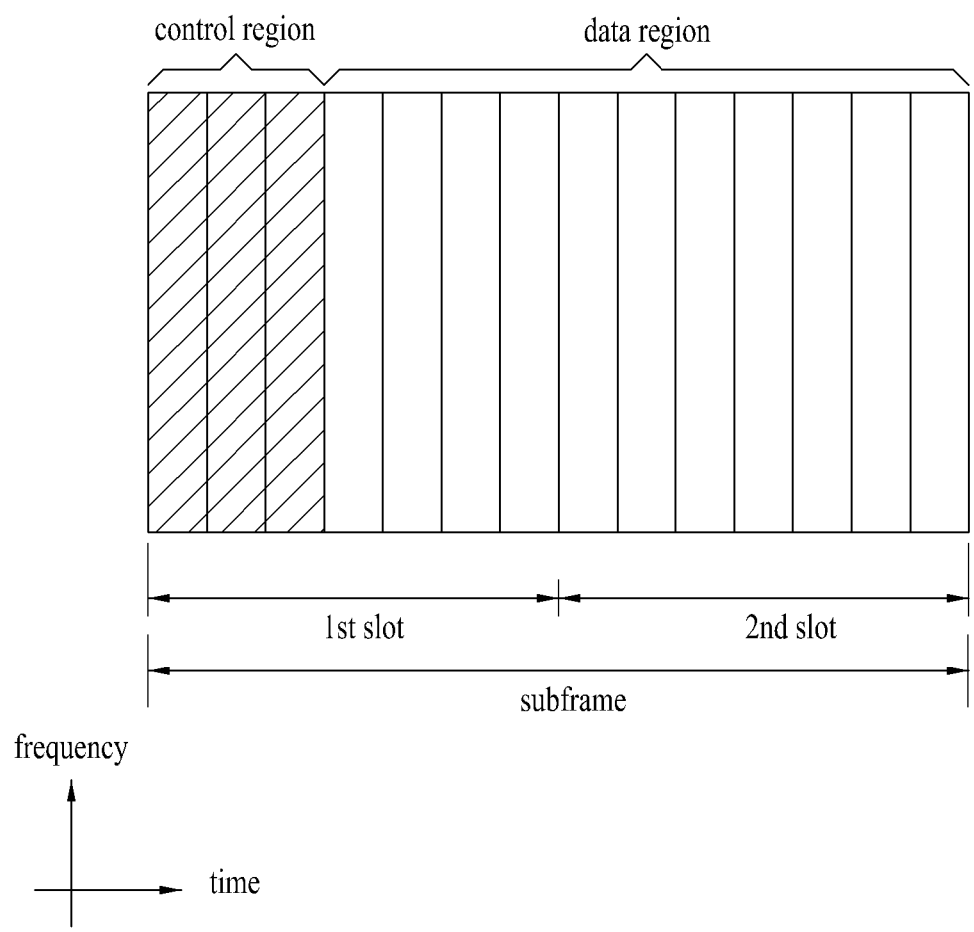
FIG. 3 illustrates a downlink subframe structure that can be used in the embodiments of the present invention.

FIG. 3 illustrates a downlink subframe structure that can be used in the embodiments of the present invention.

A subframe includes 2 slots in the time domain. Up to 3 front OFDM signals in the first slot in the subframe correspond to a control region to which control channels are allocated and the remaining OFDM signals correspond to a data region to which Physical Downlink Shared Channels (PDSCHs) are allocated.

Downlink control channels used in the 3GPP LTE system include a Physical Control Format Indicator Channel (PCFICH), a Physical Downlink Control Channel (PDCCH), and a Physical Hybrid-ARQ Indicator Channel (PHICH). A PCFICH signal transmitted in the first OFDM signal of the subframe carries information regarding the number of OFDM signals (i.e., the size of the control region) used for transmission of a control channel signal in the subframe. The PHICH carries an Acknowledgement (ACK)/Non-Acknowledgement (NACK) for an uplink Hybrid Automatic Repeat Request (HARQ). That is, an ACK/NACK signal ACK/NACK signal for uplink data transmitted by a User Equipment (UE) is transmitted in a PHICH.

Control information that is transmitted through a PDCCH is referred to as Downlink Control Information (DCI). DCI includes resource allocation information for a UE or a UE group and other control information. For example, DCI may include uplink resource allocation information, downlink resource allocation information, an uplink transmission power control command, and the like.

The PDCCH may carry transmission format and resource allocation information of a downlink shared channel (DL-SCH), transmission format and resource allocation information of an uplink shared channel (UL-SCH), paging information of a paging channel (PCH), system information of a DL-SCH, resource allocation information of a higher layer control message such as a random access response transmitted in a PDSCH, information regarding activation of Voice Of Internet Protocol (VoIP), a transmission power control command, and a transmission power control command set for individual UEs in an arbitrary UE group, and the like.

A plurality of PDCCHs may be transmitted in one control region. The UE may monitor a plurality of PDCCHs. A PDCCH may be transmitted through one or more consecutive Control Channel Elements (CCEs). A CCE is a logical allocation resource that is used to provide a PDCCH using one coding rate based on the condition of a radio channel. A CCE corresponds to a plurality of Resource Element Groups (REGs). The format of the PDCCH and the number of available bits of the PDCCH are determined according to a correlation (or relationship) between a coding rate provided in each CCE and the number of CCEs. The BS determines the format of the PDCCH according to DCI that is to be transmitted to the UE and attaches a CRC to the control information.

The CRC is masked with a unique identifier (Radio Network Temporary Identifier (RNTI)) according to the method of use of the PDCCH or the possessor of the PDCCH. If the PDCCH is for a specific UE, a unique identifier (for example, a Cell-RNTI (C-RNTI)) of the UE is masked with the CRC and, if the PDCCH is for a paging message, a paging indication identifier (for example, Paging-RNTI (P-RNTI)) is masked with the CRC. In addition, if the PDCCH is for system information (specifically, a system information block), a system information identifier and a system information RNTI (S-RNTI) may be masked with the CRC. A Random Access RNTI (RA-RNTI) may be masked with the CRC in order to indicate a random access response which is a response to reception of a random access preamble by the UE.

In the carrier aggregation environment, a PDCCH may be transmitted through one or more component carriers and may include resource allocation information regarding one or more component carriers. For example, while the PDCCH may be transmitted through one component carrier, the PDCCH may include resource allocation information regarding one or more PDSCHs and PUSCHs.

Figure 4:
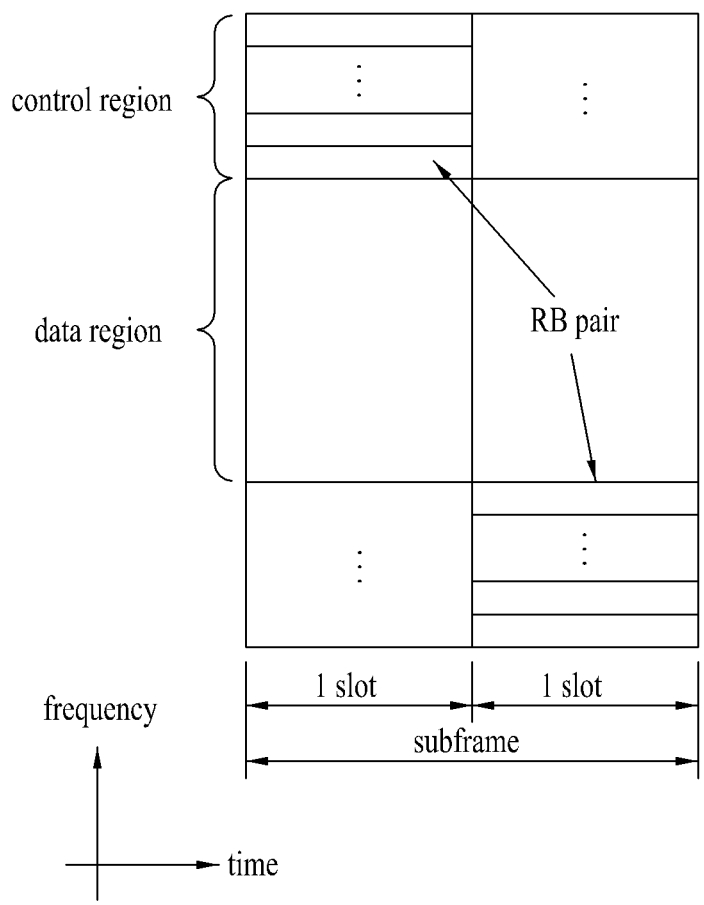
FIG. 4 illustrates an exemplary uplink subframe structure that can be used in the embodiments of the present invention.

FIG. 4 illustrates an exemplary uplink subframe structure that can be used in the embodiments of the present invention.

As shown in FIG. 4, an uplink subframe includes a plurality of slots (for example, 2 slots). The number of SC-FDMA symbols included in a slot may vary according to the length of a CP. An uplink subframe is divided into a data region and a control region in the frequency domain. The data region includes Physical Uplink Shared Channel (PUSCH) and is used to transmit a data signal including voice information. The control region includes a Physical Uplink Control Channel (PUCCH) and is used to transmit Uplink Control Information (UCI). The PUCCH includes a pair of RBs located at both ends of the data region in the frequency axis, which is frequency-hopped at a slot boundary. In the LTE system, the UE does not simultaneously a PUCCH signal and a PUSCH signal in order to maintain single-carrier characteristics. However, in the LTE-A system, the UE may simultaneously transmit a PUCCH signal and a PUSCH signal in the same subframe according to the transmission mode of the UE and may piggyback a PUCCH signal on a PUSCH.

A PUCCH of a single UE is allocated to an RB pair in a subframe and the RBs of the RB pair occupy different subcarriers in 2 slots. That is, the RB pair allocated to the PUCCH is "frequency-hopped" at a slot boundary.

The PUCCH may be used to transmit the following control information.

Scheduling Request (SR): This is information used to request uplink UL-SCH resources. The SR is transmitted using an On-Off Keying scheme.

HARQ ACK/NACK: This is a response signal to a PDCCH which indicates release of Semi-Persistent Scheduling (SPS) or a downlink data packet in a PDSCH. That is, the HARQ ACK/NACK indicates whether or not a PDCCH indicating release of SPS or a downlink data packet has been successfully received. A 1-bit ACK/NACK is transmitted as a response to a single downlink codeword and a 2-bit ACK/NACK is transmitted as a response to two downlink codewords. In the case of TDD, ACK/NACK responses to a plurality of downlink subframes are grouped and transmitted in a single PUCCH through bundling or multiplexing.

Channel Quality Indicator (CQI) or Channel State Information (CSI): This is feedback information to a downlink channel. Multiple Input Multiple Output (MIMO) related feedback information includes a Rank Indicator (RI) and a Precoding Matrix Indicator (PMI). 20 bits are used per subframe.

The amount of uplink control information (UCI) that a UE can transmit in one subframe depends on the number of SC-FDMAs available for control information transmission. The SC-FDMAs available for control information transmission are SC-FDMA symbols, excluding SC-FDMA symbols for reference signal transmission in the subframe, and also exclude the last SC-FDMA symbol of the subframe when a Sounding Reference Signal (SRS) is set in the subframe. The reference information is used for coherent detection of a PUCCH. The PUCCH supports 7 formats according to transmission transmitted in the PUCCH.

Table 1 illustrates a mapping relationship between a PUCCH format and UCI in LTE.

TABLE 1

| PUCCH format | UCI |
| --- | --- |
| Format 1 | Scheduling Request (SR) |
| Format 1a | 1-bit HARQ ACK/NACK which includes an SR or includes no SR |
| Format 1b | 2-bit HARQ ACK/NACK which includes an SR or includes no SR |
| Format 2 | CQI (20 coded bits) |
| Format 2 | 1 or 2-bit HARQ ACK/NACK for extended CP and CQI |
| Format 2a | 1-bit HARQ ACK/NACK and CQI |
| Format 2b | 2-bit HARQ ACK/NACK and CQI |

Referring to Table 1, it is possible to check UCI according to the PUCCH format.

Various radio access technologies of the 3GPP system may be applied to the embodiments of the present invention. For example, various channels such as a downlink control channel, a downlink shared channel, an uplink shared channel, and an uplink control channel may be used in the embodiments of the present invention. Here, for details of various downlink control information (DCI) formats used in a downlink control channel, reference can be made to the description of sections 7.1 to 8 of the 3GPP TS 36.213 v9.0.0 document.

In order to receive a physical downlink shared channel (PDSCH) signal, the UE needs to perform blind decoding on a PDCCH signal. Accordingly, the UE may perform blind decoding on a DCI format according to the transmission mode and/or type of an RNTI (e.g., c-RNTI or SI_RNTI) used in CRC scrambling. For details of this, reference can be made to section 7.1 of the 3GPP TS 36.213 v9.0.0 document.

In addition, in order to transmit a physical uplink shared channel (PUSCH) signal to the eNB, the UE needs to perform blind decoding on a PDCCH signal including related information. The UE may perform blind decoding on a DCI format according to the type of a specific RNTI (e.g., C-RNTI or SI_RNTI) that is to be used for CRC scrambling. For details of this, reference can be made to section 8 of the 3GPP TS 36.213 v9.0.0 document.

In addition, for details of a physical downlink control channel (PDCCH) used in the embodiments of the present invention, reference can be made to part of the 3GPP TS 36.213 v9.0.0 document, subsequent to section 6.8, and, for details of a PDCCH allocation procedure, reference can be made to section 9.1.1 of the 3GPP TS 36.213 v9.0.0 document.

The embodiments of the present invention suggest a contention based uplink channel and methods for transmitting uplink data through the contention based uplink channel for reducing uplink processing delay. The contention based uplink channel is a channel through which the UE can transmit uplink data even though a UE has not initially transmitted a UE-dedicated Scheduling Request (SR) for uplink resource allocation to an eNB. That is, the UE does not need to transmit an SR to the eNB and the eNB may not allocate uplink resources for SR transmission by a specific UE. A specific UE may also transmit uplink data earlier than an SR period allocated to the specific UE.

Accordingly, the embodiments of the present invention can provide a new CB uplink channel. In addition, a conventional physical uplink shared channel (PUSCH) or a conventional physical uplink control channel (PUCCH) may be used as a contention based uplink channel.

2. Shared Dedicated-Scheduling Request (D-SR)

The following two options may be taken into consideration in order to activate a shared D-SR.

Option 1: A UL grant may be addressed to a new SR-RNTI. That is, a new SR-RNTI may be configured for each group of shared UEs.

Option 2: PUCCH format 1a or PUCCH format 1b may be used for an SR. For example, when PUCCH format 1a is used, 2 UEs may be identified. When PUCCH format 1b is used, 4 UEs may be identified. After an eNB has received an SR which uses PUCCH format 1a or 1b, the eNB may transmit a general UL grant to an identified UE.

The following is a description of a procedure for transmitting a shared PUCCH SR using option 1.

When two or more UEs share the same SR resources, the eNB cannot determine whether or not one or more UEs use one SR. In this case, the eNB (1) may allocate a shared UL grant to the UEs or (2) may allocate a dedicated grant for each UE each time a shared SR is received.

Figure 5:
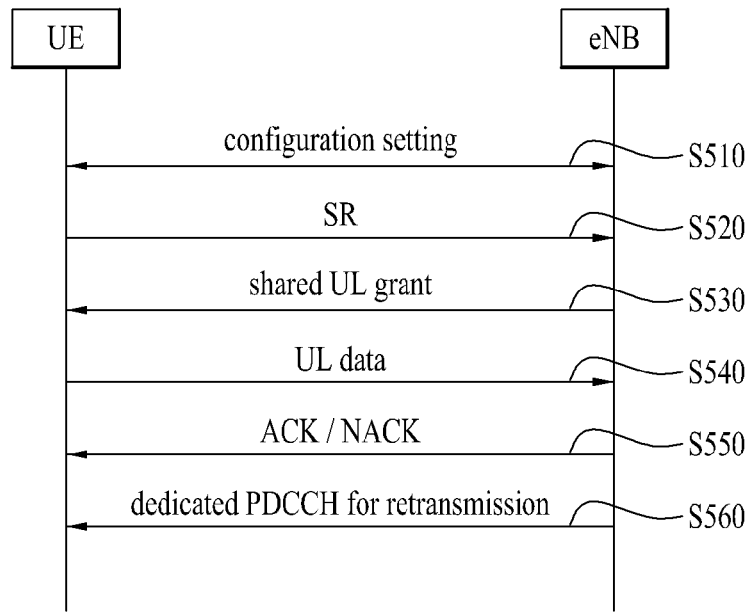
FIG. 5 illustrates an example in which an eNB allocates a shared UL grant to a UE.

FIG. 5 illustrates an example in which an eNB allocates a shared UL grant to a UE.

If it is expected that HARQ transmission will fail after the eNB allocates a shared UL grant to the UE, the eNB may allocate a dedicated grant (or transmission grant) to all UEs which share the SR.

Referring to FIG. 5, the eNB may configure a connection with one or more UEs by notifying the UEs of information (e.g., offset information and period information) regarding a wireless resource required to transmit a shared Scheduling Request (SR). Here, the shared SR resource is a PUCCH resource that a UE uses to request scheduling of the eNB and may be commonly (or redundantly) allocated to two or more UEs. The resource may be identified (or discriminated) as a physical time/frequency region and a sequence or code. Here, the sequence may include identification by a cyclic shift (S510).

The UE may transmit a shared SR signal to the eNB in order to request uplink resource allocation based on the information regarding the wireless resource received in step S510 (S520).

Upon receiving the SR, the eNB may allocate a shared uplink resource to the UE and may transmit a PDCCH signal including a shared UL grant to the UE in order to notify the UE of allocation of the shared uplink resource (S530).

The UE transmits UL data to the eNB through the allocated shared UL resource (i.e., PUSCH) (S540).

If two or more UEs simultaneously transmit UL data through a shared UL resource, the UL data of the UEs may collide with each other. UL data transmitted by a UE may contain an error or UL data may not be transmitted through the UL resource that the eNB has allocated to the UE. In this case, the eNB transmits a non-Acknowledgement (NACK) signal to the UE (S550).

In addition, the eNB may allocate a dedicated UL resource to each UE for new uplink resource allocation. For example, the eNB may allocate a dedicated UL grant to each of the UEs which share an SR. Alternatively, the eNB may allocate a dedicated UL grant to some of the UEs that share the Sr and allow the remaining UEs to perform non-adaptive HARQ retransmission through a shared PUSCH resource (S560).

It is possible to prevent collision between a plurality of UL data and also to control retransmission delay by allocating a dedicated UL grant to each UE whose UL transmission has failed as in FIG. 5.

Unlike FIG. 5, the eNB may allocate a dedicated grant to each UE each time a shared SR is received. Even when an SR is shared by a plurality of UEs through dedicated signaling configuration, the eNB may allocate a dedicated UL grant to each UE.

Through this, it is possible to prevent collision between uplink data of UEs when the UEs perform PUSCH transmission and it is possible to use the same retransmission method as that used in the LTE Rel-8 system. Since all UEs which have received a UL grant do not have data to be transmitted, a part of the PUSCH signal may be discarded. If the eNB allocates a dedicated UL grant each time an SR is received, PUSCH resource consumption may be lower than that of transmission of a CB through a PUSCH (i.e., transmission of a CB-PUSCH).

Figure 6:
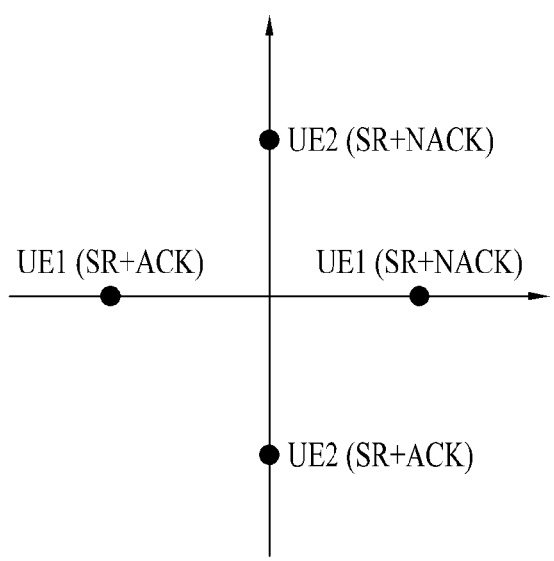
FIG. 6 illustrates a method of using PUCCH formats 1a and 1b for a shared PUCCH-SR.

FIG. 6 illustrates a method of using PUCCH formats 1a and 1b for a shared PUCCH-SR.

The following is a description of a method of using PUCCH format 1a or PUCCH format 1b for a shared PUCCH SR as option 2. As shown in FIG. 6, each UE may share the same SR without collision by using the PUCCH format 1a or 1b. That is, even when two UEs transmit an SR in the same TTI, an eNB can successfully detect the SR and can identify each UE.

The following is a description of the case in which a contention based PUSCH signal transmission method and a D-Sr method are used together.

The contention based uplink channel is a channel that is allocated since the eNB cannot predict when a Scheduling Request (SR) or a Bandwidth Request (BR) of each UE will be needed. When the UE is in an emergency situation or in an environment in which the UE is moving at a high speed, the UE may need to perform fast communication with the eNB. In this case, it may be inefficient for a UE to perform a procedure for configuring a connection with an eNB through a number of signaling processes. The contention based uplink channel is used when a UE needs to perform fast communication with an eNB.

Under the assumption that contention based resource allocation is possible for every TTI, there may be a difference of 3 ms and 1 ms between CB transmission and SR periods. This is because the UE does not need to await a response to a D-SR after transmitting the D-SR to the eNB. The same effects may be achieved through dedicated UL resources that have already been allocated. However, it costs much to allocate dedicated resources to all UEs in every TTI.

Figure 7:
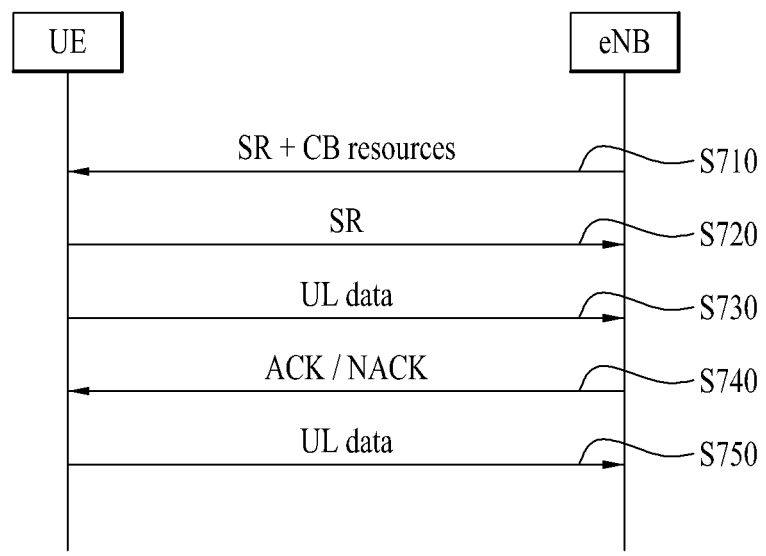
FIG. 7 illustrates an exemplary scheduling request procedure associated with contention based uplink data transmission.

FIG. 7 illustrates an exemplary scheduling request procedure associated with contention based uplink data transmission.

As shown in FIG. 7, an eNB may transmit resource information (i.e., SR resource information) required for a shared dedicated scheduling request (D-SR) and resource information (i.e., CB resource information) of a contention based uplink channel to one or more UEs (S710).

In step S710, the SR resource information indicates information regarding a PUCCH resource that the UE uses in order to send a scheduling request to the eNB and the CB resource information indicates information regarding a PUSCH resource for contention based uplink data transmission. The SR resource information and the CB resource information may be commonly (or redundantly) allocated to two or more UEs. In addition, the SR resource information and the CB resource information may be identified (or discriminated) as a physical time/frequency region and a sequence or code.

In step S710, such configuration and allocation may be performed through higher layer signaling such as Radio Resource Control (RRC) signaling. However, when dynamic UL resource allocation is needed, such allocation may be replaced with allocation which is performed using a PDCCH signal including a CB-RNTI.

When one or more UEs have UL data to be transmitted, each of the UEs may transmit a Scheduling Request (SR) to the eNB in order to be allocated an uplink resource through which the UL data is to be transmitted (S720).

The UE may transmit uplink data (i.e., a Transport Block (TB)) to the eNB without awaiting a UL grant in response to SR transmission (S730).

The eNB may identify the UE using a CB resource based on the received SR. When the eNB has received one or more SRs associated with the same UL resource, the eNB may determine that a collision has occurred between UEs. Accordingly, the eNB may transmit a NACK signal and a dedicated UL grant regardless of whether uplink data has been received normally. If the eNB receives only one SR associated with the same UL resource, the eNB may determine that no collision has occurred between UEs. Accordingly, when the eNB has normally received UL data transmitted through the UL resource, the eNB may transmit an ACK signal to the UE, otherwise the eNB may transmit a NACK signal to the UE (S740).

The UE may retransmit the UL data upon receiving a NACK signal from the eNB and may transmit new UL data upon receiving an ACK signal (S750).

Since the UE has been identified through an SR in step S750, the UE may adaptively retransmit UL data to the eNB through another UL resource. Through this, the UE may reduce load of CB resources.

3. Contention Based Uplink Channel Signal Transmission Method

In the method of transmitting an uplink signal through a Contention Based (CB) uplink channel (e.g., a CB-PUSCH or a CB-PUCCH), a UE, which has achieved uplink synchronization, transmits an uplink channel signal to an eNB even when the UE has not been initially allocated an uplink resource for uplink data transmission according to a general method.

That is, in the CB UL channel signal transmission method, the UE transmits a Scheduling Request (SR) to an eNB and transmits an uplink channel signal without a process of receiving allocation of an uplink resource in response to the SR. This CB UL channel signal transmission method can reduce transmission delay and signaling overhead.

In the following, the method of transmitting an UL signal through a CB UL channel is referred to as "CB transmission" or "UL transmission" for short. The channel signal includes both an uplink data signal and an uplink control signal. The CB UL channel may include a CB-PUCCH and a CB-PUSCH and the CB-PUCCH and the CB-PUSCH are a conventional PUSCH and a conventional PUCCH which have been allocated as contention based channels. The CB-PUCCH and the CB-PUSCH may also be channels which are in new formats which are very different from those of the conventional PUSCH and the conventional PUCCH.

A general feature of CB transmission is that the error rate of a plurality of users who use the same shared UL grant is increased. Therefore, it is important that an eNB has a fast and efficient resource allocation means and method for CB transmission and Contention Free (CF) transmission.

Although an uplink resource for CB transmission may be configured and allocated through higher layer signaling such as Radio Resource Control (RRC) signaling, the method of fast dynamic allocation of uplink RBs for CB transmission uses a downlink physical control channel (PDCCH). A CB grant transmitted in a PDCCH may be used to allocate an uplink resource for CB transmission. A PDCCH signal and a Contention Based Radio Network Temporary Identifier (CB-RNTI) may be used to identify a CB grant transmitted in a PDCCH. The CB grant may be scheduled every subframe, similar to other grants. Using such a method, scheduling of uplink CF transmission may be unaffected by CB transmission and it is also possible to avoid static or non-static allocation of CB resources while CB resources are being dynamically allocated according to uplink load.

For uplink (UL) transmission of a UE, a CB grant may indicate a transmission resource in a PUSCH. Accordingly, CB uplink data may be transmitted in a PUSCH. Only when a UE does not have a dedicated CF grant at a specific time, the UE can transmit CB-UL data through an uplink resource (i.e., a CB UL channel resource) indicated in the CB grant.

when a shared resource is used, a C-RNTI MAC control element may be added to a MAC PDU in order to identify the UE and a Buffer Status Report (BSR) may be used to help an uplink scheduler of the eNB. Simultaneously with CB transmission, the UE may transmit a Scheduling Request (SR) for requesting a CF resource to the eNB.

That is, uplink data is transmitted in a PUSCH, a C-RNTI MAC control element is added to identify the UE, and, simultaneously with initial UL transmission, the BSR may be transmitted from the UE in order to help the uplink scheduler.

4. Uplink Signal Transmission Method Using Contention Based Identifier

In embodiments of the present invention, an eNB may designate a plurality of contention based (CB) resources or CB identifiers for each UE or the UE may select and use a CB resource and a CB identifier. For example, the eNB may allocate a CB resource to each UE or UE group according to characteristics of the UE or the UE group. Alternatively, each UE may arbitrarily select and use a CB resource configured by the eNB according to characteristics of the UE.

The following is a description of the case in which a UE selects a CB resource for a CB UL channel configured by an eNB.

① The UE may use resource allocation information of any CB UL channel from among resource allocation information of a plurality of CB UL channels transmitted by the eNB. In this case, although there is an advantage in that there is a full freedom of configuration between the UE and the eNB, there is a disadvantage in that it is not possible to achieve characterization of each CB UL channel and characteristic adjustment between UEs.

② The eNB may designate a CB resource class that is to be used by the UE. In this case, since the eNB can limit the range and the number of UEs for access according to the characteristics of a specific CB UL channel, it is possible to perform fine control of QoS and to control collisions that may occur in the channel. When there are a number of UEs that request characteristics according to each class, the eNB may discriminate a channel that is to be used for each UE instead of increasing the number of channels.

③ The eNB may designate a time interval or a frequency band of a CB resource that can be used by a UE. That is, each UE is not allowed to use all CB UL channel resources but instead a CB UL channel resource which can be used by each UE to perform control access may be set such that the eNB can access a specific resource region in a specific time/space/frequency/code space. In this case, it is possible to reduce the probability of resource collision in a deterministic manner when a number of UEs such as M2M devices attempt to simultaneously access the CB UL channel.

The following is a description of methods in which an eNB designates a CB UL channel resource to be used for each UE. The eNB needs to limit access to a CB UL channel resource that is to be used by a UE in order to address the problem of collision between UEs which can use the resource at a specific time and to guarantee QoS according to the characteristics of each UE. Accordingly, the eNB may control allocation of a CB UL channel to each UE by allocating a CB identifier (a CB RNTI or a CB ID) to the UE or may control access of each UE to a CB UL channel through CB UL channel resource allocation. In the embodiments of the present invention, the CB identifier is used to identify a mapping relationship between CB UL channels and UEs.

Figure 8:
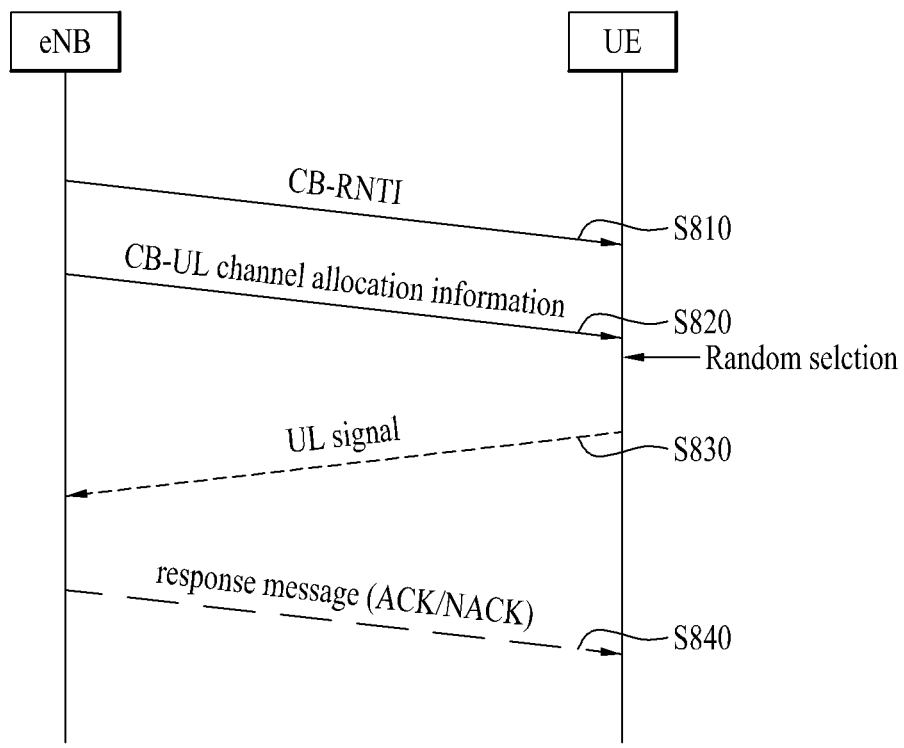
FIG. 8 illustrates a method for allocating an identifier associated with a contention based uplink channel by an eNB according to an embodiment of the present invention.

FIG. 8 illustrates a method for allocating an identifier associated with a contention based uplink channel by an eNB according to an embodiment of the present invention.

An eNB may allocate a CB identifier to each UE or UE group. The eNB may transmit allocated CB identifiers to each UE through a protocol in a user plane and/or a control plane. The user plane includes a Packet Data Convergence Protocol (PCCP), a Radio Link Control (RLC) protocol, a Medium Access Control (MAC) protocol, or a physical layer (PHY) protocol and the control plane includes a Radio Resource Control (RRC) protocol. Alternatively, the CB identifier(s) that the eNB has allocated in step S810 may be transmitted to each UE or UE group through a physical downlink control channel (for example, a PDCCH of the LTE system or an A-MAP in the IEEE 802.16m system). Here, the CB identifier(s) allocated to each UE or each UE group may be commonly (or redundantly) used (S810).

The eNB may transmit a message including allocation information of a CB UL channel, which each UE or UE group is to use using the CB identifier allocated by the UE, to the UE or UE group. Each UE may detect and decode allocation information of the CB UL channel allocated to the UE using the CB identifier allocated to the UE. Each UE may acquire allocation information of the CB UL channel through CRC check and/or blind decoding of a downlink control channel signal (e.g., a PDCCH or A-MAP signal). Alternatively, each UE may acquire the allocation information of the CB UL channel through a separately defined reference signal (S820).

In step S820, the allocation information of the CB UL channel may be transmitted in a unicast manner only when the CB UL channel is needed. Alternatively, in order to reduce overhead of a downlink control signal, the allocation information of the CB UL channel may be transmitted through a broadcast channel (for example, an MIB or SIB in the LTE system or a superframe header (SFH) or an AAI-SCD message in the IEEE 802.16m system). Here, one or more CB UL channels may be allocated to one CB identifier and a plurality of CB identifiers may indicate one CB UL channel.

When each UE needs to transmit a UL signal to the eNB, the UE may transmit the UL signal to the eNB using allocation information of the CB UL channel and the CB identifier(s) allocated to the UE. Here, the UL signal may include UL data and/or UL control information (S830).

In step S830, the UE may arbitrarily select and use parameters of one or more specific physical channels. For example, each UE may select and use a cyclic shift value of a Reference Signal (RS) or a pilot signal. Here, the cyclic shift value of the RS or the like may be selected from preset values or a set of values signaled by the eNB. If one or more CB identifiers or CB UL channels are allocated to one UE, the UE may select a CB UL channel according to a predetermined rule or an instruction from the eNB.

The eNB which has received a UL signal through a CB UL channel may transmit a response message to the UE in response to the UL signal. Here, the response message may include an ACK/NACK signal indicating whether or not the UL signal has been normally received (S840).

In step S840, when the eNB has a UE identifier (for example, a C-RNTI or Station identifier (STID)) of each UE, the eNB may transmit a response message using the UE identifier together with the CB identifier. Alternatively, the eNB may transmit a response message to each UE using the UE identifier instead of the CB identifier.

The response message preferably includes information (for example, the cyclic shift value of the RS or the like) regarding the parameter that the UE has selected in step S830. Alternatively, the eNB may allocate, to the UE, a specific physical uplink channel rather than the CB UL channel and may transmit the response message of step S840, which includes newly allocated physical uplink channel information, to the UE.

The UE may receive the response message of the UL signal through the CB UL channel from the eNB. Here, the UE may compare one or more values among the CB identifier used by the UE and the parameter selected by the UE with the response message and may determine whether or not the response message is destined for the UE.

Figure 9:
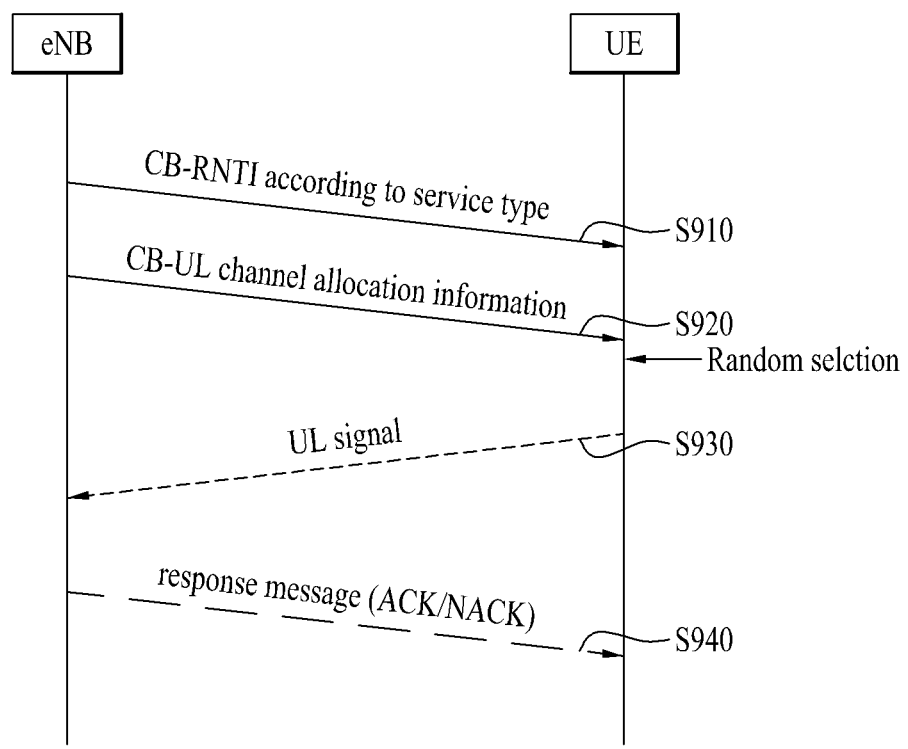
FIG. 9 illustrates a method for allocating a CB identifier according to service type according to an embodiment of the present invention.

FIG. 9 illustrates a method for allocating a CB identifier according to service type according to an embodiment of the present invention.

As shown in FIG. 9, the eNB may allocate a CB identifier to each UE or UE group according to service type. The eNB may transmit the allocated CB identifiers to each UE through a protocol in a user plane and/or a control plane. The user plane includes a Packet Data Convergence Protocol (PCCP), a Radio Link Control (RLC) protocol, a Medium Access Control (MAC) protocol, or a physical layer (PHY) protocol and the control plane includes a Radio Resource Control (RRC) protocol. Alternatively, the CB identifier(s) allocated by the eNB may be transmitted to each UE or UE group through a physical downlink control channel (for example, a PDCCH of the LTE system or an A-MAP in the IEEE 802.16m system). Here, the CB identifier(s) allocated to each UE or each UE group may be commonly (or redundantly) used (S910).

Each service type which is discriminated from each other in step S910 may be a Voice of Internet Protocol (VoIP), Hypertext Transfer Protocol (HTTP), M2M, and/or gaming service type. Here, the M2M service type may further be divided into metering, tracking and tracing, secured access and surveillance, public safety, remote maintenance and control, retail and/or consumer electronics.

The eNB may transmit a message including allocation information of a CB UL channel, which each UE or UE group is to use using the CB identifier allocated by the UE, to the UE or UE group. Each UE may detect and decode allocation information of the CB UL channel allocated to the UE using the CB identifier allocated to the UE. Each UE may acquire allocation information of the CB UL channel through CRC check and/or blind decoding of a downlink control channel signal (e.g., a PDCCH or A-MAP signal). Alternatively, each UE may acquire the allocation information of the CB UL channel through a separately defined reference signal (S920).

In step S920, the allocation information of the CB UL channel may be transmitted in a unicast manner only when the CB UL channel is needed. Alternatively, in order to reduce overhead of a downlink control signal, the allocation information of the CB UL channel may be transmitted through a broadcast channel (for example, an MIB or SIB in the LTE system or a superframe header (SFH) or an AAI-SCD message in the IEEE 802.16m system). Here, one or more CB UL channels may be allocated to one CB identifier and a plurality of CB identifiers may indicate one CB UL channel.

When each UE needs to transmit a UL signal for a specific service through a CB UL channel, the UE may transmit the UL signal to the eNB using allocation information of the CB UL channel and the CB identifier(s) allocated to the UE. Here, the UL signal may include UL data and/or UL control information (S930).

In step S930, the UE may arbitrarily select and use parameters of one or more specific physical channels. For example, each UE may select and use a cyclic shift value of a Reference Signal (RS) or a pilot signal. Here, the cyclic shift value of the RS or the like may be selected from preset values or a set of values signaled by the eNB. If one or more CB identifiers or CB UL channels are allocated to one UE, the UE may select a CB UL channel according to a predetermined rule or an instruction from the eNB.

The eNB which has received a UL signal through a CB UL channel may transmit a response message to the UE in response to the UL signal (S940).

In step S940, when the eNB has a UE identifier (for example, a C-RNTI or Station identifier (STID)) of each UE, the eNB may transmit a response message using the UE identifier together with the CB identifier. Alternatively, the eNB may transmit a response message to each UE using the UE identifier instead of the CB identifier.

The response message preferably includes information (for example, the cyclic shift value of the RS or the like) regarding the parameter that the UE has selected in step S930. Alternatively, the eNB may allocate, to the UE, a specific physical uplink channel rather than the CB UL channel and may transmit the response message of step S940, which includes newly allocated physical uplink channel information, to the UE.

The UE may receive the response message of the UL signal through the CB UL channel from the eNB. Here, the UE may compare one or more values among the CB identifier used by the UE and the parameter selected by the UE with the response message and may determine whether or not the response message is destined for the UE.

In the example of FIG. 9, the eNB may allocate a CB UL channel differently for each service type by using a CB identifier according to the service type. Accordingly, in a cell in which a specific service should be provided in a large amount, the eNB may allocate a large number (or large amount) of CB UL channels for the specific service or may adjust CB UL channel parameters so as to suit services in which the frequency of use of a CB UL channel is high. This allows the eNB to efficiently operate physical resources. In addition, the eNB can reduce the probability of collisions in CB UL channels according to the specific service type.

Figure 10:
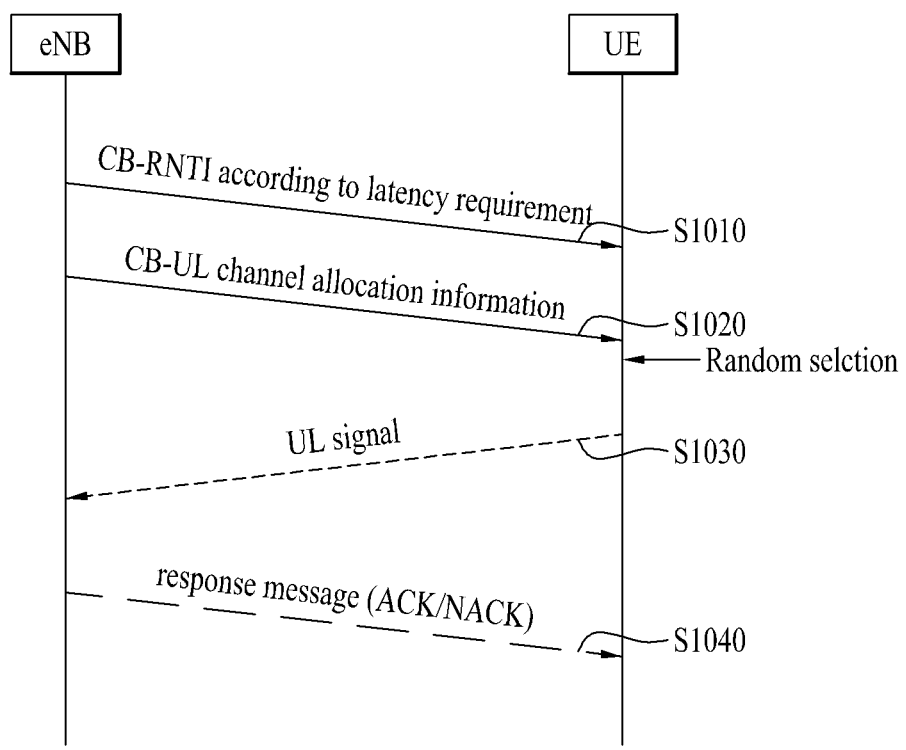
FIG. 10 illustrates a method for allocating a CB identifier according to latency requirement according to an embodiment of the present invention.

FIG. 10 illustrates a method for allocating a CB identifier according to latency requirement according to an embodiment of the present invention.

As shown in FIG. 10, the eNB may allocate a CB identifier to each UE or UE group according to latency requirement (or delay request). The eNB may transmit the allocated CB identifiers to each UE through a protocol in a user plane and/or a control plane. The user plane includes a Packet Data Convergence Protocol (PCCP), a Radio Link Control (RLC) protocol, a Medium Access Control (MAC) protocol, or a physical layer (PHY) protocol and the control plane includes a Radio Resource Control (RRC) protocol. Alternatively, the CB identifier(s) that the eNB has allocated in step S810 may be transmitted to each UE or UE group through a physical downlink control channel (for example, a PDCCH of the LTE system or an A-MAP in the IEEE 802.16m system). Here, the CB identifier(s) allocated to each UE or each UE group may be commonly (or redundantly) used (S1010).

In step S1010, latency requirements which are discriminated from each other may be defined as reference values (e.g., low latency, middle latency, or high latency) of a specific time or period associated with latency. In addition, each latency requirement which is discriminated from each other may be defined as a time associated with service type. Here, when the latency requirement is defined as a time associated with service type, the latency requirement may be determined based only on a correlation of service types regardless of the time. That is, the eNB may reflect latency requirement according to service type and may allocate a CB identifier(s) according to a plurality of service types to each UE or UE group.

Each service type which is discriminated from each other in step S1010 may be a Voice of Internet Protocol (VoIP), Hypertext Transfer Protocol (HTTP), M2M, and/or gaming service type. Here, the M2M service type may further be divided into metering, tracking and tracing, secured access and surveillance, public safety, remote maintenance and control, retail and/or consumer electronics.

The eNB may transmit a message including allocation information of a CB UL channel, which each UE or UE group is to use using the CB identifier allocated by the UE, to the UE or UE group. Each UE may detect and decode allocation information of the CB UL channel allocated to the UE using the CB identifier allocated to the UE. Each UE may acquire allocation information of the CB UL channel through CRC check and/or blind decoding of a downlink control channel signal (e.g., a PDCCH or A-MAP signal). Alternatively, each UE may acquire the allocation information of the CB UL channel through a separately defined reference signal (S1020).

In step S1020, the allocation information of the CB UL channel may be transmitted in a unicast manner only when the CB UL channel is needed. Alternatively, in order to reduce overhead of a downlink control signal, the allocation information of the CB UL channel may be transmitted through a broadcast channel (for example, an MIB or SIB in the LTE system or a superframe header (SFH) or an AAI-SCD message in the IEEE 802.16m system). Here, one or more CB UL channels may be allocated to one CB identifier and a plurality of CB identifiers may indicate one CB UL channel.

When each UE needs to transmit a UL signal according to a specific latency requirement, the UE may transmit the UL signal through a CB UL channel corresponding to the CB identifier according to latency requirement. Here, the UL signal may include UL data and/or UL control information (S1030).

In step S1030, the UE may arbitrarily select and use parameters of one or more specific physical channels. For example, each UE may select and use a cyclic shift value of a Reference Signal (RS) or a pilot signal. Here, the cyclic shift value of the RS or the like may be selected from preset values or a set of values signaled by the eNB. If one or more CB identifiers or CB UL channels are allocated to one UE, the UE may select a CB UL channel according to a predetermined rule or an instruction from the eNB.

The eNB which has received a UL signal through a CB UL channel may transmit a response message to the UE in response to the UL signal (S1040).

In step S1040, when the eNB has a UE identifier (for example, a C-RNTI or Station identifier (STID)) of each UE, the eNB may transmit a response message using the UE identifier together with the CB identifier. Alternatively, the eNB may transmit a response message to each UE using the UE identifier instead of the CB identifier.

The response message preferably includes information (for example, the cyclic shift value of the RS or the like) regarding the parameter that the UE has selected in step S1030. Alternatively, the eNB may allocate, to the UE, a specific physical uplink channel rather than the CB UL channel and may transmit the response message of step S1040, which includes newly allocated physical uplink channel information, to the UE.

The UE may receive the response message of the UL signal through the CB UL channel from the eNB. Here, the UE may compare one or more values among the CB identifier used by the UE and the parameter selected by the UE with the response message and may determine whether or not the response message is destined for the UE.

In the example of FIG. 10, the eNB may allocate a CB UL channel differently according to latency requirement by using the CB identifier according to latency requirement. Thus, the eNB does not allocate a large number (or large amount) of CB UL channels for CB identifiers that do not require fast access and allocates a small number (or small amount) of CB UL channels for CB identifiers that require fast access. This allows the eNB to efficiently operate physical resources without an increase in processing delay of the UE. In addition, the eNB can reduce the probability of collisions in CB UL channels according to a specific latency requirement.

Although a CB identifier may indicate a CB UL channel in the embodiments of the present invention, the CB identifier may also indicate a range of allocated resources or a specific resource region in a CB UL channel. The eNB may designate resources which are to be used according to various parameter values (for example, latency requirement, payload size, power level, QoS, or collision probability) reported by the UE. Accordingly, the eNB may divide a physical uplink control channel into a CB UL channel, a CB UL resource range, a CB UL resource unit, or the like according to various parameter values and may then allocate the CB UL channel, the CB UL resource range, the CB UL resource unit, or the like to each UE. Here, the resource may indicate various multiplexing domains such as time, frequency, code, or spatial opportunity.

5. Method of Allocating Contention Based Uplink Channel Based on Periodicity

In the above embodiments, when the eNB allocates a CB UL channel, the eNB may periodically allocate a CB UL channel in order to reduce downlink control signal overhead. For example, the eNB may allocate a CB UL channel at intervals of a specific number of subframes, a specific number of frames, or a specific number of superframes.

If the eNB frequently changes CB UL channel allocation when the eNB periodically allocates a CB UL channel, system and UE complexity may be increased. In addition, such periodic CB UL channel allocation may impose great limitations on scheduling of the eNB. For example, even though the eNB needs to use a greater amount of physical resources in a specific subframe, the eNB cannot efficiently use physical resources due to periodic allocation of CB channels. Thus, there is a need to provide a method for solving the confliction of scheduling overhead and scheduling restrictions.

Figure 11:
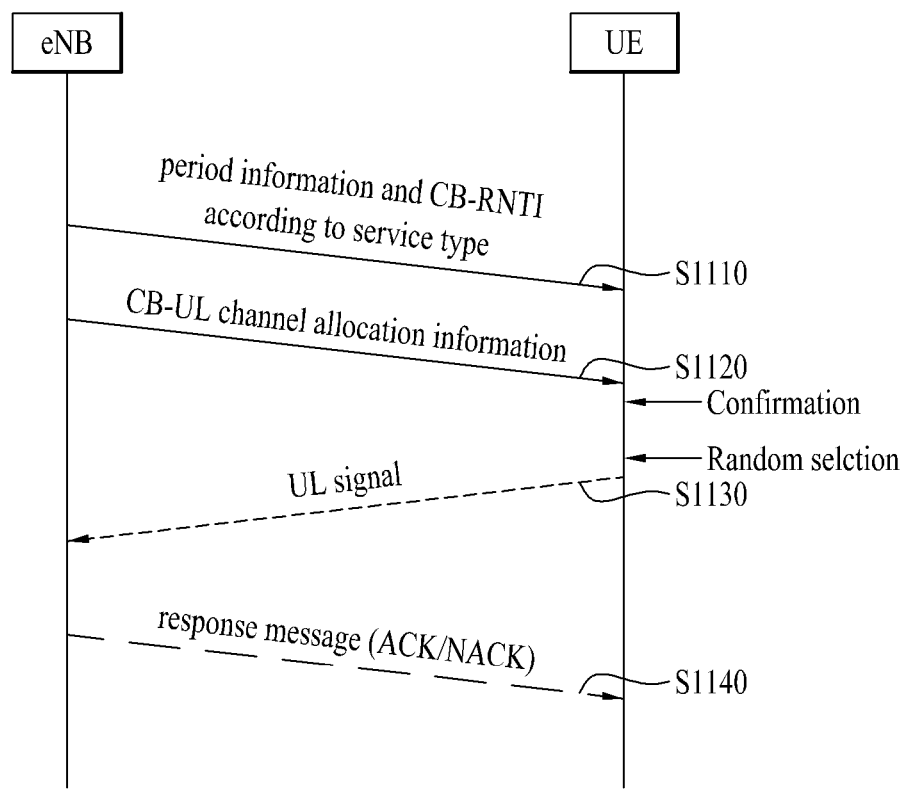
FIG. 11 illustrates a method for allocating a contention based uplink channel through a confirmation procedure according to an embodiment of the present invention.

FIG. 11 illustrates a method for allocating a contention based uplink channel through a confirmation procedure according to an embodiment of the present invention.

An eNB may notify a UE of information regarding an allocation period of a CB UL channel through higher layer (for example, MAC layer or RRC layer) signaling. The UE may use the CB UL channel through a downlink control channel (for example, a PDCCH or an A-MAP).

As shown in FIG. 11, the eNB may allocate, to each UE or UE group, an allocation time period (i.e., period information) of a CB UL channel according to service type and a CB identifier according to service type. The eNB may transmit CB identifiers and period information to each UE through a protocol in a user plane and/or a control plane. The user plane includes a PCCP, an RLC protocol, a MAC protocol, or a PHY protocol and the control plane includes an RRC protocol. Alternatively, the CB identifier(s) and period information that the eNB has allocated in step S1110 may be transmitted to each UE or UE group through a physical downlink control channel (for example, a PDCCH or an A-MAP). Here, the CB identifier(s) allocated to each UE or each UE group may be commonly (or redundantly) used (S1110).

Each service type which is discriminated from each other in step S1110 may be a VoIP, HTTP, M2M, and/or gaming service type. Here, the M2M service type may further be divided into metering, tracking and tracing, secured access and surveillance, public safety, remote maintenance and control, retail and/or consumer electronics.

In FIG. 11, it is preferable that the eNB need not necessarily allocate a CB UL channel in a CB UL channel allocation period in order to reduce scheduling restrictions of the eNB. In addition, each UE may predict whether or not a CB UL channel which the UE can use is to be allocated using period information and CB identifiers allocated to the UE. That is, the CB UL channel allocation period indicates a time, at which it is possible to allocate a CB UL channel, rather than indicating that a CB UL channel has actually been allocated. Accordingly, each UE may check whether or not a CB UL channel has actually been allocated through CRC check and/or blind decoding of a downlink control channel (e.g., a PDCCH or A-MAP) signal in the allocation period. In addition, each UE may acquire allocation information of the CB UL channel through a reference signal or decoding of a downlink control signal. If the eNB has allocated a CB UL channel in a period of the CB UL channel, the eNB may transmit, to each UE or UE group, a message including allocation information of a CB UL channel that each UE is to use using an allocated CB identifier (S1120).

In step S1120, the confirmation procedure through the downlink control channel may be performed by checking a CB-RNTI value masked in a PDCCH signal. For example, it is possible to determine that a CB UL channel has been allocated when information associated with a CB-RNTI allocated to the UE is detected and to determine that a CB UL channel has not been allocated when information associated with a CB-RNTI allocated to the UE is not detected.

When each UE needs to transmit a UL signal for a specific service through a CB UL channel, the UE may transmit the UL signal to the eNB using allocation information of the CB UL channel and the CB identifier(s) allocated to the UE. Here, the UL signal may include UL data and/or UL control information (S1130).

In step S1130, the UE may arbitrarily select and use parameters of one or more specific physical channels. For example, each UE may select and use a cyclic shift value of a Reference Signal (RS) or a pilot signal. Here, the cyclic shift value of the RS or the like may be selected from preset values or a set of values signaled by the eNB. If one or more CB identifiers or CB UL channels are allocated to one UE, the UE may select a CB UL channel according to a predetermined rule or an instruction from the eNB.

The eNB which has received a UL signal through a CB UL channel may transmit a response message to the UE in response to the UL signal (S1140).

In step S1140, when the eNB has a UE identifier (for example, a C-RNTI or Station identifier (STID)) of each UE, the eNB may transmit a response message using the UE identifier together with the CB identifier. Alternatively, the eNB may transmit a response message to each UE using the UE identifier instead of the CB identifier.

The response message preferably includes information (for example, the cyclic shift value of the RS or the like) regarding the parameter that the UE has selected in step S1130. Alternatively, the eNB may allocate, to the UE, a specific physical uplink channel rather than the CB UL channel and may transmit the response message of step S1140, which includes newly allocated physical uplink channel information, to the UE.

The UE may receive the response message of the UL signal through the CB UL channel from the eNB. Here, the UE may compare one or more values among the CB identifier used by the UE and the parameter selected by the UE with the response message and may determine whether or not the response message is destined for the UE.

In the example of FIG. 11, the eNB may allocate a CB UL channel differently for each service type by using a CB identifier according to the service type. Accordingly, in a cell in which a specific service should be provided in a large amount, the eNB may allocate a large number (or large amount) of CB UL channels for the specific service or may adjust CB UL channel parameters so as to suit services in which the frequency of use of a CB UL channel is high. This allows the eNB to efficiently operate physical resources. In addition, the eNB can reduce the probability of collisions in CB UL channels according to the specific service type.

Figure 12:
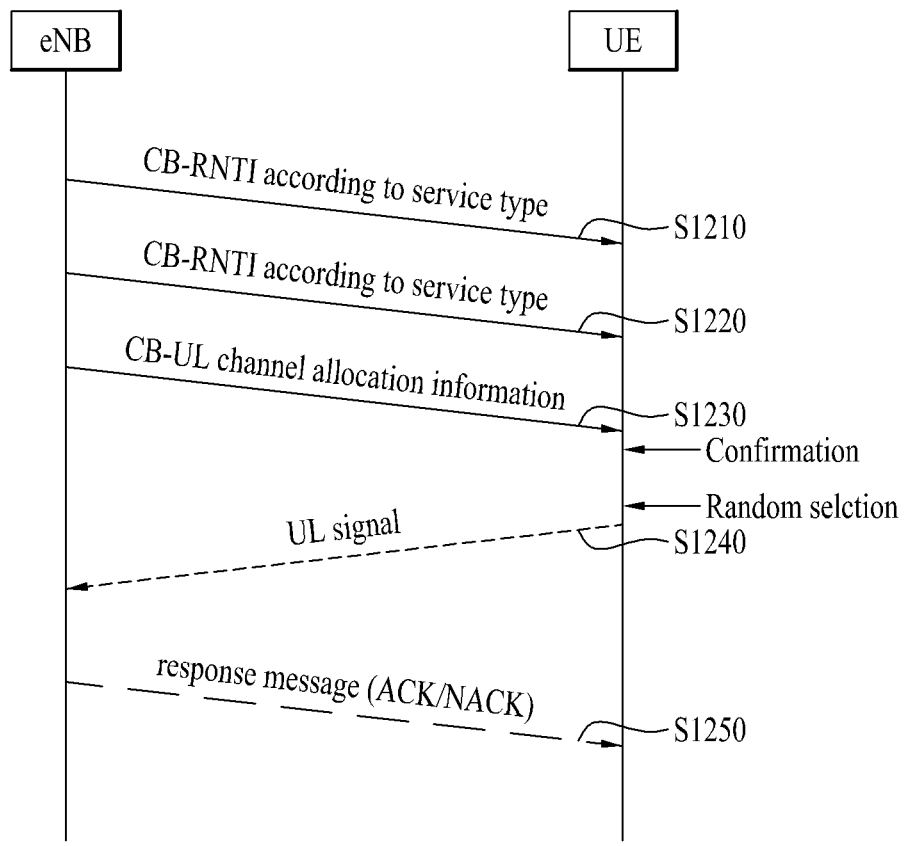
FIG. 12 illustrates another method for allocating a contention based uplink channel through a confirmation procedure according to an embodiment of the present invention.

FIG. 12 illustrates another method for allocating a contention based uplink channel through a confirmation procedure according to an embodiment of the present invention.

An eNB may allocate a time period, in which each UE can use a CB UL channel, through a broadcast channel (for example, an MIB or SIB in the LTE system or an SFH in the IEEE 802.16m system) or a downlink control channel. In addition, the UE can use a CB UL channel through a confirmation procedure using a downlink channel.

As shown in FIG. 12, the eNB may allocate a CB identifier to each UE or UE group according to service type. The eNB may transmit a message including the allocated CB identifiers to each UE through a protocol (e.g., a PDCP, RLC, MAC, or PHY protocol) in a user plane and/or through a protocol (e.g., an RRC protocol) in a control plane. Alternatively, the CB identifier(s) allocated by the eNB may be transmitted to each UE or UE group through a physical downlink control channel (for example, a PDCCH of the LTE system or an A-MAP in the IEEE 802.16m system). Here, the CB identifier(s) allocated to each UE or each UE group may be commonly (or redundantly) used. For example, a plurality of CB UL channels may be allocated to one CB identifier and, on the contrary, a plurality of CB identifiers may indicate one CB UL channel (S1210).

Each service type which is discriminated from each other in step S1210 may be a VoIP, HTTP, M2M, and/or gaming service type. Here, the M2M service type may further be divided into metering, tracking and tracing, secured access and surveillance, public safety, remote maintenance and control, retail and/or consumer electronics.

CB UL channel allocation may be performed through a broadcast channel signal in order to reduce overhead of a downlink control signal. For example, the eNB may transmit a unicast downlink control message or a broadcast message, which includes period information regarding a time period for allocation of a CB UL channel according to service type, to the UE through a broadcast channel (S1220).

Each UE may detect and decode allocation information of the CB UL channel allocated to the UE using the period information and the CB identifier allocated to the UE. However, it is preferable that the eNB need not necessarily allocate a CB UL channel in a CB UL channel allocation period in order to reduce scheduling restrictions of the eNB. That is, the CB UL channel allocation period indicates a time, at which it is possible to allocate a CB UL channel, rather than indicating that a CB UL channel has actually been allocated. If the eNB has allocated a CB UL channel in a period of the CB UL channel, the eNB may transmit, to each UE or UE group, a message including allocation information of a CB UL channel that each UE is to use using an allocated CB identifier. Accordingly, each UE may check whether or not a CB UL channel has actually been allocated through CRC check and/or blind decoding of a downlink control channel (e.g., a PDCCH or A-MAP) signal in the allocation period. In addition, each UE may acquire allocation information of the CB UL channel through a reference signal or decoding of a downlink control signal (S1230).

In step S1230, the confirmation procedure through the downlink control channel may be performed by checking a CB-RNTI value masked in a PDCCH signal. For example, it is possible to determine that a CB UL channel has been allocated when information associated with a CB-RNTI allocated to the UE is detected and to determine that a CB UL channel has not been allocated when information associated with a CB-RNTI allocated to the UE is not detected.

When each UE needs to transmit a UL signal for a specific service through a CB UL channel, the UE may transmit the UL signal to the eNB using allocation information of the CB UL channel and the CB identifier(s) allocated to the UE. Here, the UL signal may include UL data and/or UL control information (S1240).

In step S1240, the UE may arbitrarily select and use parameters of one or more specific physical channels. For example, each UE may select and use a cyclic shift value of a Reference Signal (RS) or a pilot signal. Here, the cyclic shift value of the RS or the like may be selected from preset values or a set of values signaled by the eNB. If one or more CB identifiers or CB UL channels are allocated to one UE, the UE may select a CB UL channel according to a predetermined rule or an instruction from the eNB.

The eNB which has received a UL signal through a CB UL channel may transmit a response message to the UE in response to the UL signal (S1250).

In step S1250, when the eNB has a UE identifier (for example, a C-RNTI or Station identifier (STID)) of each UE, the eNB may transmit a response message using the UE identifier together with the CB identifier. Alternatively, the eNB may transmit a response message to each UE using the UE identifier instead of the CB identifier.

The response message preferably includes information (for example, the cyclic shift value of the RS or the like) regarding the parameter that the UE has selected in step S1250. Alternatively, the eNB may allocate, to the UE, a specific physical uplink channel rather than the CB UL channel and may transmit the response message of step S1140, which includes newly allocated physical uplink channel information, to the UE.

The UE may receive the response message of the UL signal through the CB UL channel from the eNB. Here, the UE may compare one or more values among the CB identifier used by the UE and the parameter selected by the UE with the response message and may determine whether or not the response message is destined for the UE.

In FIGS. 11 and 12, the eNB may perform a confirmation operation for persistent allocation using a specific field included in allocation information of a CB UL channel while allocating a CB UL channel to each UE through a downlink control channel (e.g., a PUCCH or an A-MAP). Through a confirmation procedure through a DL control channel, the UE can determine that a CB UL channel, which has been allocated to the UE, is fixedly allocated at intervals of a specific period.

The above embodiments of the present invention disclose methods in which an eNB provides UEs with an access method and configuration information of a CB UL channel resource through UE-specified signaling or system information to allow each of the UEs to use a specific CB UL channel resource.

If, for CB UL channel resources, the eNB configures and signals scheduling information of a CB UL channel every subframe or every transmission period, eNB complexity and processing delay time may be increased and wireless resources may be wasted. To reduce these problems, it is preferable that information allowing the UE to determine whether or not to access a specific CB UL channel be provided to the UE through minimum signaling between the eNB and the UE.

For example, if the eNB transmits configuration information of each CB UL channel to each UE every subframe when a number of CB UL channels can be used by UEs, each UE consumes power and time in order to extract CB UL channel configuration information from every subframe.

Accordingly, in the embodiments of the present invention, availability of CB UL channels which can be used by UEs may be indicated in a bitmap format. That is, a bitmap may be used to indicate whether or not a specific CB UL channel is present in a specific subframe.

Alternatively, for a specific CB UL channel or CB UL channel group, it is possible to specify a group of information indicating whether or not the CB UL channel is present at intervals of a predetermined period. That is, the eNB may allocate CB UL channels through periodic or time-based setting or a bitmap. In this case, the UE may access a CB UL channel by receiving allocation information of the CB UL channel at a specific time.

Here, the UE may receive the allocation information of the CB UL channel through scheduling information transmitted at a specific time or a broadcast message. The eNB may notify each UE of information regarding the specific time through dedicated signaling or system information.

6. Method of Classifying and Using Contention Based Identifiers

In the embodiments of the present invention, a plurality of CB identifiers and/or CB UL channels may be allocated to one UE. A method in which a UE uses a plurality of opportunities is described below in detail. A CB UL channel resource that can be used by a UE may be a channel resource that is directly indicated to the UE or a CB UL channel resource that an eNB provides as system information.

When a plurality of opportunities is present for a plurality of CB identifiers and/or a plurality of CB UL channel resources, it is possible to apply the following one or more classification references (or classification criteria) for CB identifiers and/or CB UL channel resources. The following classification references may also be applied to a CB code (for example, a reference signal) in a specific CB UL channel resource.

①A UE may be configured so as to select an opportunity for a CB UL channel by classifying (dividing, identifying, or discriminating) MCS related variables which are expected to be applied when CB UL channels are used. The MCS related variables include a coding rate, a modulation order, a MIMO mode, uplink channel quality, an interference level, path loss, and/or propagation loss.

For example, the UE may be allowed to use a front portion of a time region of a CB UL channel in the case of an opportunity in which it is expected that it is possible to perform communication at a low coding rate from among a plurality of opportunities and the UE may be allowed to use a rear portion of the time region of the CB UL channel in the case of an opportunity in which it is expected that it is possible to perform communication at a high coding rate. A time point at which the time region is divided may be predetermined or signaled from the eNB. Through such a configuration, it is possible to achieve such classification and support with a low probability of collision for each MCS.

② The UE may be configured so as to select an opportunity for a CB UL channel by classifying (identifying or discriminating) an emergency call/service. For example, the UE may be allowed to use a front portion of a time region of a CB UL channel in the case of an opportunity corresponding to an emergency call/service from among a plurality of opportunities and the UE may be allowed to use a rear portion of the time region of the CB UL channel in the case of an opportunity corresponding to a general call/service. A time point at which the time region is divided may be predetermined or signaled from the eNB. Through such a configuration, the UE can perform fast uplink data transmission of an emergency call/service with a low probability of collision.

③A UE may be configured so as to select an opportunity for a CB UL channel by classifying (dividing, identifying, or discriminating) a service type. For example, a set of opportunities for the case in which there is a need to transmit a service type which is or predetermined or which is signaled from an eNB from among a plurality of opportunities for a CB UL channel may be predetermined or an opportunity according to service type may be classified (or identified) through signaling by an eNB.

In addition, the UE may be allowed to use a front portion of a time region of a CB UL channel in the case of an opportunity in which there is a need to transmit a service type which is predetermined or which is signaled from the eNB from among a plurality of opportunities, otherwise the UE may be allowed to use a rear portion of the time region of the CB UL channel.

A time point at which the time region is divided may be predetermined by the system or may be signaled from the eNB. Through such a configuration, it is possible to adjust the probability of collision for each service type. Accordingly, the UE and the eNB can efficiently utilize CB UL channel resources and the UE can quickly and successfully transmit UL signals. In addition, latency may also be adjusted for each service type.

④A UE may be configured so as to select an opportunity for a CB UL channel by classifying (dividing, identifying, or discriminating) a latency requirement. For example, the UE may be allowed to use a front portion of a time region of a CB UL channel in the case of an opportunity in which a low latency requirement is needed from among a plurality of opportunities and the UE may be allowed to use a rear portion of the time region of the CB UL channel in the case of an opportunity in which a low latency requirement is not needed.

Alternatively, when backoff windows are used, the UE may be allowed to use a small backoff window in the case of an opportunity in which a low latency requirement is needed from among a plurality of opportunities, otherwise the UE may be allowed to use a relatively large backoff window. Here, the time point of division of the time region of the CB UL channel may be predetermined by the network or may be signaled from the eNB. The UE and the eNB may adjust (or control) the probability of collision for each latency requirement through such a configuration. In addition, the UE and the eNB can achieve such efficient support according to each latency requirement and can also efficiently utilize CB UL channel resources.

⑤ Each UE may be configured so as to select an opportunity for a CB UL channel by classifying (dividing, identifying, or discriminating) an operating SNR region (or required transmission power level) of the UE. For example, in the case of a UE which operates at a low SNR, the probability of an increase in latency due to retransmission is low since the UE is highly likely to successfully transmit a UL signal using a CB UL channel. Accordingly, such a UE which operates at a low SNR may be allowed to use a rear portion of a time region in a plurality of opportunities of a CB UL channel and a UE which operates at a high SNR (or at a high required transmission power level) may be allowed to use a front portion of the time region.

CB UL channel resources that can be used by a UE that performs operations which are classified (divided or discriminated) according to the characteristics of the above cases of ①~⑤ may include not only opportunities corresponding to simple divisions of the time region but also opportunities corresponding to divisions of a frequency region, code resources, or a spatial region. Such definition may be represented in association with a specific dimension in which CB UL channel resources are configured or characteristics that are supported for different CB UL channel resources may be defined and signaled to the UE.

That is, according to a feature which is required in a specific CB UL channel resource, the UE may selectively use the resource or may selectively use the CB UL channel. In addition, if the UE is configured so as to simultaneously use a CB UL channel and a dedicated channel, each UE may selectively use the CB UL channel and the dedicated channel according to characteristics.

Based on such definitions of classifications of the above cases of ①~⑤, opportunities for a CB UL channel may be selected using the following methods.

a. A specific subset or group for classification of a plurality of opportunities may be predetermined in the system or the eNB may signal an opportunity for transmission of each UL signal to the UE using signaling through the MAC layer, the PHY layer, or the like. For example, the UE may be set to use a specific set of opportunities from among a plurality of opportunities or use the opportunities in a predetermined order when there is a need to use a CB UL channel for an emergency call/service.

b. Reference values for classification (identification or discrimination) of a plurality of opportunities (for example, a threshold, latency, throughput, payload size, a value indicating whether or not to perform retransmission, a value indicating whether or not to provide an ACK/NACK response or the like) may be predefined in the system. Alternatively, the eNB may notify each UE of an opportunity using signaling through the RLC layer, the MAC layer, or PHY layer.

For example, when one or more divisions (or classifications) are present, the eNB may signal one value to the UE, thereby allowing the UE to acquire, from the signaled value, each reference value (or intermediate point) divided by two divisions from among all available opportunities.

c. Probability, priority, or access class for classification of a plurality of opportunities may be predetermined in the system. Alternatively, the eNB may notify each UE of a CB UL channel using signaling through the RLC layer, the MAC layer, or PHY layer.

For example, when one or more divisions (or classifications) are present, the eNB may signal one value to the UE, thereby allowing the UE to acquire, from the signaled value, each probability divided by two divisions from among all available opportunities.

7. Method of Overlapping with Other Data Channel or Control Channel

In the case in which a UE transmits a UL signal (e.g., a UL data signal or a UL control signal) to an eNB through a CB UL channel, it is difficult for the eNB to allocate an MCS level for the UL signal in advance. It is also difficult for each UE to measure uplink quality of the UE by itself and to set an appropriate MCS level. In addition, physical resources may be wasted since the eNB cannot be aware of load (i.e., the amount of use) of the CB UL channel in advance.

In embodiments of the present invention described below, the eNB and UE may allocate a plurality of corresponding physical resources of a basic unit (for example, a Resource Block (RB) or Resource Unit (RU) in the LTE system or a Physical Resource Unit (PRU), a Logical Resource Unit (LRU), or a Distributed Resource Unit (DRU) in the IEEE 802.16m system) of resource allocation to a CB UL channel in order to solve such problems.

Figure 13:
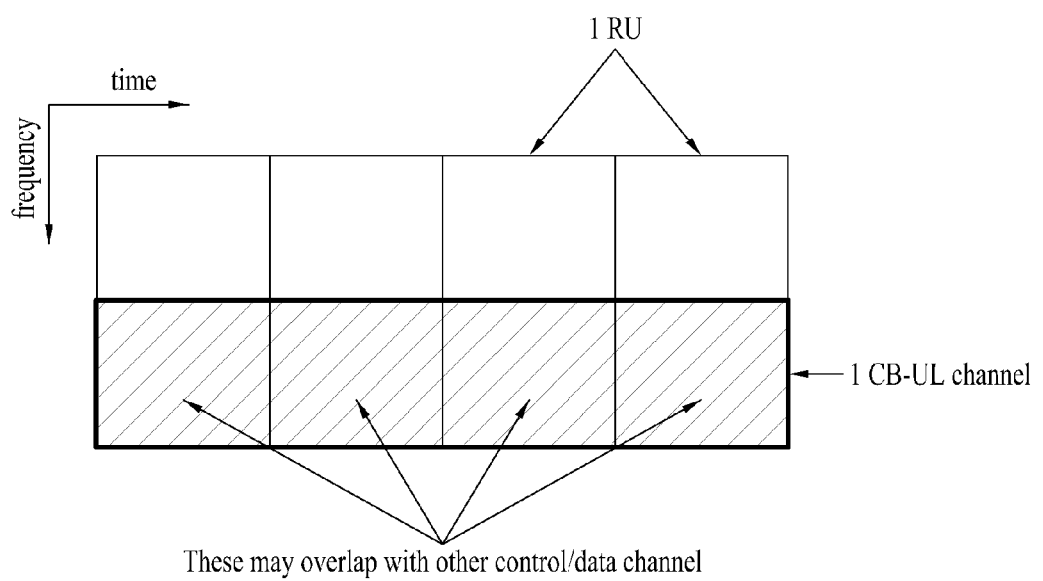
FIG. 13 illustrates an exemplary allocation structure of a contention based uplink channel according to an embodiment of the present invention.

FIG. 13 illustrates an exemplary allocation structure of a contention based uplink channel according to an embodiment of the present invention.

As shown in FIG. 13, a physical resource region may be divided into time and frequency regions and the smallest resource allocation unit is Resource Unit (RU). Here, a CB UL channel may include 4 RUs in the time domain. As shown in FIG. 13, a CB UL channel may include one or more physical resource units in the time and/or frequency domain.

A low coding rate (for example, a coding rate of 1/12) may be used for the CB UL channel. When a low coding rate is applied to the CB UL channel, the UE may perform transmission with low power per subcarrier taking into consideration that the eNB acquires the same reception energy.

That is, the UE may transmit a signal over a large number of subcarriers using low power per subcarrier and the eNB may detect the signal by collecting the subcarriers. Accordingly, time or frequency-space resources may be used in the CB UL channel such that low energy is spread in physical resources.

When needed, the eNB may use all or part of a resource region, to which such a CB UL channel has been allocated, through overlapping or superposition with a channel for another control or data signal. Since such an overlapping channel for another control/data signal is transmitted with relatively high power per subcarrier, performance reduction may not be great even when UEs transmit a UL signal in the CB UL channel.

On the other hand, even when a signal with relatively high power per subcarrier is present in the overlapping channel region, a UE(s) may transmit a signal having the effects of spread over large time or frequency-extended resources in the CB UL channel. Accordingly, the eNB may not undergo great performance reduction in collecting and detecting such signals.

As a result, the eNB and the UE may commonly use a physical resource, to which a CB UL channel has been allocated, for allocation of another control/data signal. Accordingly, it is possible to guarantee detection and demodulation performance of a CB UL channel signal in a state in which the eNB cannot be aware of a channel condition of the UE and it is also possible to minimize waste of physical resource allocation to CB UL channels by the eNB.

When a CB UL channel is used in common with another channel, it is preferable to minimize the influence of the CB UL channel upon other channel performance. It is also preferable that transmission power of a UL signal transmitted by the UE have a low coding rate as described above. Here, the eNB may notify the UE of a reference value for setting the power level of the UE For example, given a command regarding a reference value for a power level that can be used by the UE in the CB UL channel, the reference value may be defined as a power level that may be added based on a user-specific setting value, path loss, and/or propagation loss that the UE needs to have. Such a command may be provided to each UE through a dynamic scheduling command or higher signaling.

The UE which accesses the CB UL channel needs to be careful in setting a pilot between the channel estimation of the UE and the overlapping channel in addition to the power level. The pilot signal for use in the CB UL channel may have a greater number of spreading factors (or a greater spreading factor) than data. The pilot signal may have a power transmission level that has been boosted compared to a data signal.

In addition, it is preferable that a region in which pilots are absent support a structure in which actual data is not transmitted (for example, a structure in which a signal is not transmitted at a position corresponding to a pilot signal through rate matching or by applying puncturing) in order not to affect traffic of UEs that perform scheduled transmission.

Figure 14:
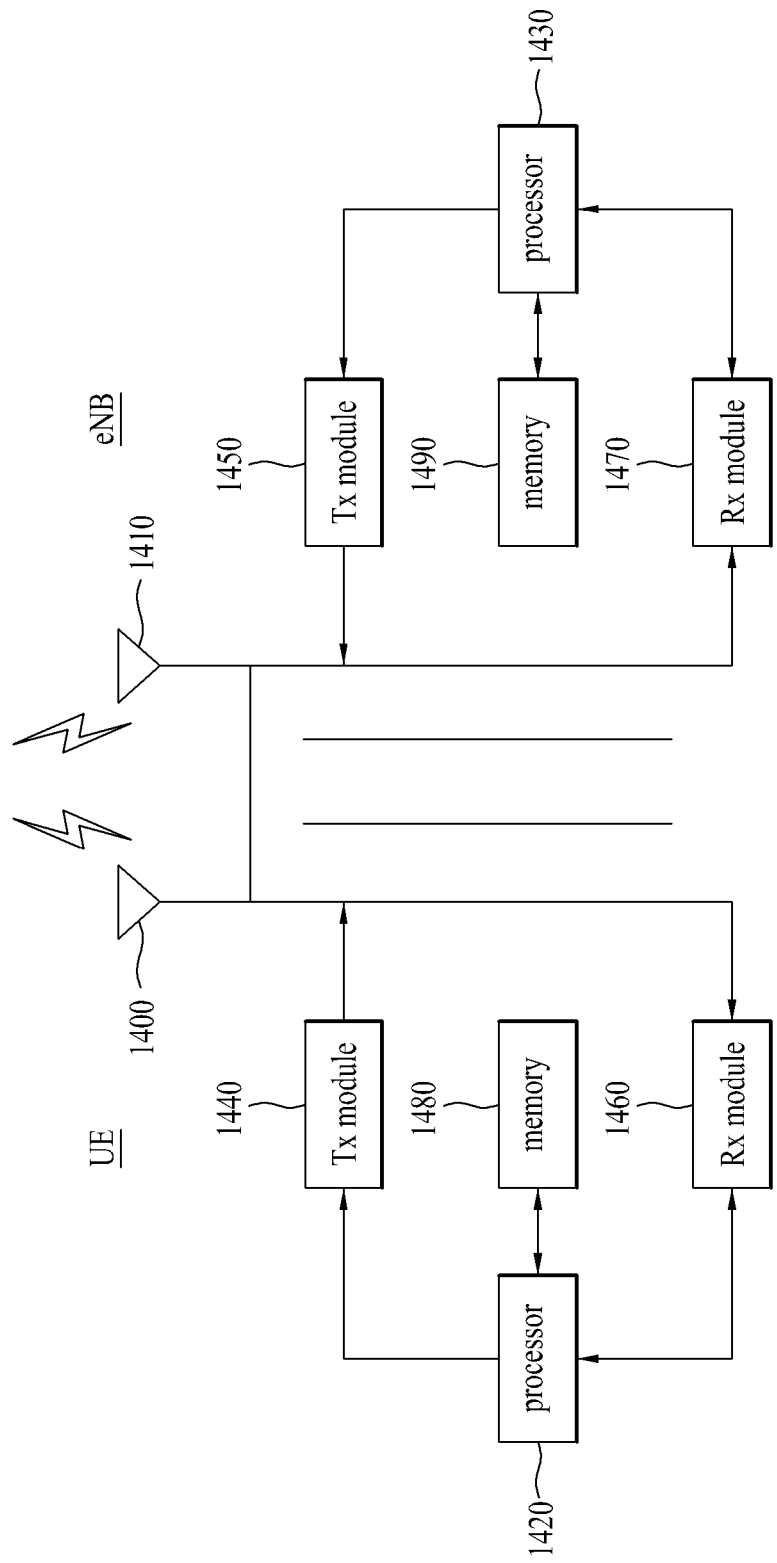
FIG. 14 illustrates an exemplary apparatus according to an embodiment of the present invention which supports a method of transmitting or receiving a contention based uplink channel signal using a contention based identifier according to the present invention.

FIG. 14 illustrates an exemplary apparatus according to an embodiment of the present invention which supports a method of transmitting or receiving a contention based uplink channel signal using a contention based identifier according to the present invention.

A User Equipment (UE) may operate as a transmitter in uplink and may operate as a receiver in downlink. An e-Node B (eNB) may operate as a receiver in downlink and may operate as a transmitter in downlink.

That is, the UE and the eNB may include transmission modules (Tx modules) 1440 and 1450 and reception modules (Rx modules) 1460 and 1470 for transmitting and receiving information, data, and/or messages, respectively, and may include antennas 1400 and 1410 for transmitting and receiving information, data, and/or messages, respectively. The UE and the eNB may also include processors 1420 and 1430 for performing the embodiments of the present invention and memories 1480 and 1490 for temporarily or persistently storing processes of the processors.

Particularly, the processors 1420 and 1430 of the UE and eNB may support the methods of transmitting and receiving contention based uplink channel signals which are described above in the embodiments of the present invention. For example, the processor of the eNB may allocate period information of a CB identifier and/or a CB UL channel to the UE taking into consideration service type and/or latency requirement. In addition, it is possible to decode a UL signal transmitted to the UE based on matching information of a specific CB UL channel and a CB identifier allocated to the UE. The processor of the UE may be allocated a CB identifier from the eNB and may transmit a UL signal to the eNB through a CB UL channel to which the CB identifier according to service type and/or latency requirement is mapped.

The transmission and reception modules included in each of the UE and the eNB may perform a packet modulation/demodulation function for data (or signal) transmission, a fast packet channel coding function, an Orthogonal Frequency Division Multiple Access (OFDMA) packet scheduling function, a Time Division Duplex (TDD) packet scheduling function, and/or a channel multiplexing function. The UE and the eNB of FIG. 14 may further include a low power Radio Frequency (RF)/Intermediate Frequency (IF) module.

The apparatuses described above with reference to FIG. 14 are means for implementing the various methods of transmitting and receiving contention based UL channel signals according to the embodiments of the present invention described above. The embodiments of the present invention can be implemented using the components and functions of the UE and eNB apparatuses described above.

A Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a handheld PC, a notebook computer, a smartphone, or a MultiMode-MultiBand (MM-MB) terminal may be used as the mobile terminal in the present invention.

Here, the term "smartphone" refers to a terminal which combines advantageous features of a mobile communication terminal and a PDA, specifically, a terminal constructed by incorporating functions of a PDA, such as a scheduling function, a facsimile transmission and reception function, and a data communication function including an Internet connection function, into a mobile communication terminal. The term "MM-MB terminal" refers to a terminal that includes a multi-modem chip such that it can operate in all communication systems such as a portable internet system and other mobile communication systems (for example, a Code Division Multiple Access (CDMA) 2000 system, a Wideband CDMA (WCDMA) system, etc.).

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described above. For example, software code can be stored in a memory unit 1480 or 1490 so as to be executed by a processor 1420 or 1430. The memory unit may be located inside or outside the processor and can communicate data with the processor through a variety of known means.

The present invention may be embodied in other specific forms than those set forth herein without departing from the essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. In addition, claims which are not explicitly dependent on each other can be combined to provide an embodiment or new claims can be added through amendment after this application is filed.

[Industrial Applicability]

The embodiments of the present invention may be applied to various wireless access systems. Examples of the wireless access systems include a 3GPP LTE system, a 3GPP LTE-A system, and/or an IEEE 802.xx system. The embodiments of the present invention may be applied not only to the various wireless access systems but also to all technical fields to which the various wireless access systems are applied.

The invention claimed is:

1. A method for transmitting an uplink (UL) signal using a Contention Based (CB) identifier, the method comprising:
   receiving, by a user equipment from a base station, a first message including the CB identifier and period information of a Contention Based Uplink (CB UL) channel associated with the CB identifier;
   receiving, by the user equipment from the base station, a second message including allocation information of the CB UL channel;
   decoding the second message using the CB identifier at a time point indicated by the period information to check whether or not the CB UL channel has been actually allocated to the user equipment; and
   transmitting, by the user equipment to the base station, the UL signal through the CB UL channel.

2. The method according to claim 1, wherein the CB identifier is allocated to the user equipment taking into consideration service type or latency requirement.

3. The method according to claim 1, wherein the first message is received through a broadcast channel and the second message is received through a downlink physical channel.

4. The method according to claim 1, wherein the period information of the CB UL channel is determined according to a service type.

5. A method for receiving an uplink (UL) signal using a Contention Based (CB) identifier, the method comprising:
   transmitting, by a base station to a user equipment, a first message including the CB identifier and period information of a Contention Based Uplink (CB UL) channel associated with the CB identifier;
   transmitting, by the base station to the user equipment, a second message including allocation information of a the CB UL channel;
   wherein the second message is decoded by using the CB identifier at a time point indicated by the period information to check whether or not the CB UL channel has been actually allocated to the user equipment; and
   receiving, by the base station from the user equipment, the UL signal through the CB UL channel.

6. The method according to claim 5, wherein the CB identifier is allocated to the user equipment taking into consideration service type or latency requirement.

7. The method according to claim 5, wherein the first message is received through a broadcast channel and the second message is received through a downlink physical channel.

8. The method according to claim 5, wherein the period information of the CB UL channel is determined according to a service type.

9. A user equipment for transmitting an uplink (UL) signal using a Contention Based (CB) identifier, the user equipment comprising:
   a reception module;
   a transmission module; and
   a processor configured to:
   receive a first message including the CB identifier and period information of a Contention Based Uplink (CB UL) channel associated with the CB identifier from a base station and a second message including allocation information of the CB UL channel from the base station using the reception module,
   decode the second message using the CB identifier at a time point indicated by the period information to check whether or not the CB UL channel has been actually allocated to the user equipment, wherein
   the user equipment transmits the UL signal to the base station through the CB UL channel using the transmission module.

10. The user equipment according to claim 9, wherein the CB identifier is allocated to the user equipment taking into consideration service type or latency requirement.

11. The user equipment according to claim 9, wherein the first message is received through a broadcast channel and the second message is received through a downlink physical channel.

12. The user equipment according to claim 9, wherein the period information of the CB UL channel is determined according to service type.

* * * * *